United States Patent
Numata et al.

(10) Patent No.: US 12,298,463 B2
(45) Date of Patent: May 13, 2025

(54) INSPECTION SYSTEM AND STORAGE MEDIUM

(71) Applicant: CANON KABUSHIKI KAISHA, Tokyo (JP)

(72) Inventors: Aihiko Numata, Tokyo (JP); Takahiro Sato, Kanagawa (JP); Tatsuhito Goden, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 17/955,691

(22) Filed: Sep. 29, 2022

(65) Prior Publication Data
US 2023/0110775 A1 Apr. 13, 2023

(30) Foreign Application Priority Data
Oct. 8, 2021 (JP) ................. 2021-166027

(51) Int. Cl.
G01N 21/3581 (2014.01)
G01V 8/20 (2006.01)
G06V 10/141 (2022.01)
G06V 10/145 (2022.01)
H04N 5/265 (2006.01)
H04N 23/56 (2023.01)

(52) U.S. Cl.
CPC .............. *G01V 8/20* (2013.01); *G06V 10/141* (2022.01); *G06V 10/145* (2022.01); *H04N 5/265* (2013.01); *H04N 23/56* (2023.01); *G06V 2201/05* (2022.01)

(58) Field of Classification Search
CPC ...... G01V 8/20; G06V 10/141; G06V 10/145; G06V 2201/05; H04N 5/265; H04N 23/56; G01N 21/3586; G01N 21/3581
See application file for complete search history.

(56) References Cited

U.S. PATENT DOCUMENTS

| | | | |
|---|---|---|---|
| 10,897,073 B2 | 1/2021 | Sato et al. | |
| 2012/0249782 A1 | 10/2012 | Oda | |
| 2012/0261576 A1* | 10/2012 | Tomioka | B82Y 20/00 250/495.1 |
| 2014/0243614 A1* | 8/2014 | Rothberg | A61B 8/5207 600/407 |
| 2015/0122055 A1* | 5/2015 | Puckett | G01N 29/04 73/865.8 |

(Continued)

FOREIGN PATENT DOCUMENTS

GB 2489582 A8 10/2015
JP 2020-153974 A 9/2020

OTHER PUBLICATIONS

Feb. 8, 2023 Extended Search Report in European Patent Application 22 199 097.1.

*Primary Examiner* — Dani Fox
*Assistant Examiner* — Mamadou Faye
(74) *Attorney, Agent, or Firm* — Venable LLP

(57) ABSTRACT

In an inspection system that uses terahertz waves, in order to improve the inspection precision for objects and the like, the inspection system has an illumination unit having a plurality of illumination elements that radiate terahertz waves; a camera unit that captures images of the terahertz waves that have been reflected off of an object that has been irradiated by the plurality of illumination elements; and a control unit that performs control so as to make the light emission timings for the plurality of illumination elements different.

26 Claims, 17 Drawing Sheets

(56) References Cited

U.S. PATENT DOCUMENTS

| | | |
|---|---|---|
| 2017/0257617 A1* | 9/2017 | Retterath .............. G01S 17/931 |
| 2020/0293806 A1 | 9/2020 | Sato et al. |
| 2020/0296265 A1 | 9/2020 | Itsuji et al. |
| 2020/0296266 A1 | 9/2020 | Koyama et al. |
| 2021/0058570 A1 | 2/2021 | Sato |
| 2021/0247308 A1 | 8/2021 | Itsuji |
| 2021/0281327 A1 | 9/2021 | Sato |
| 2021/0382967 A1* | 12/2021 | Goergen .............. H04L 9/3263 |
| 2022/0099721 A1 | 3/2022 | Saito et al. |
| 2022/0317331 A1 | 10/2022 | Goden |
| 2023/0281772 A1* | 9/2023 | Ichikawa ........... G01N 21/8851 |
| | | 348/86 |

* cited by examiner

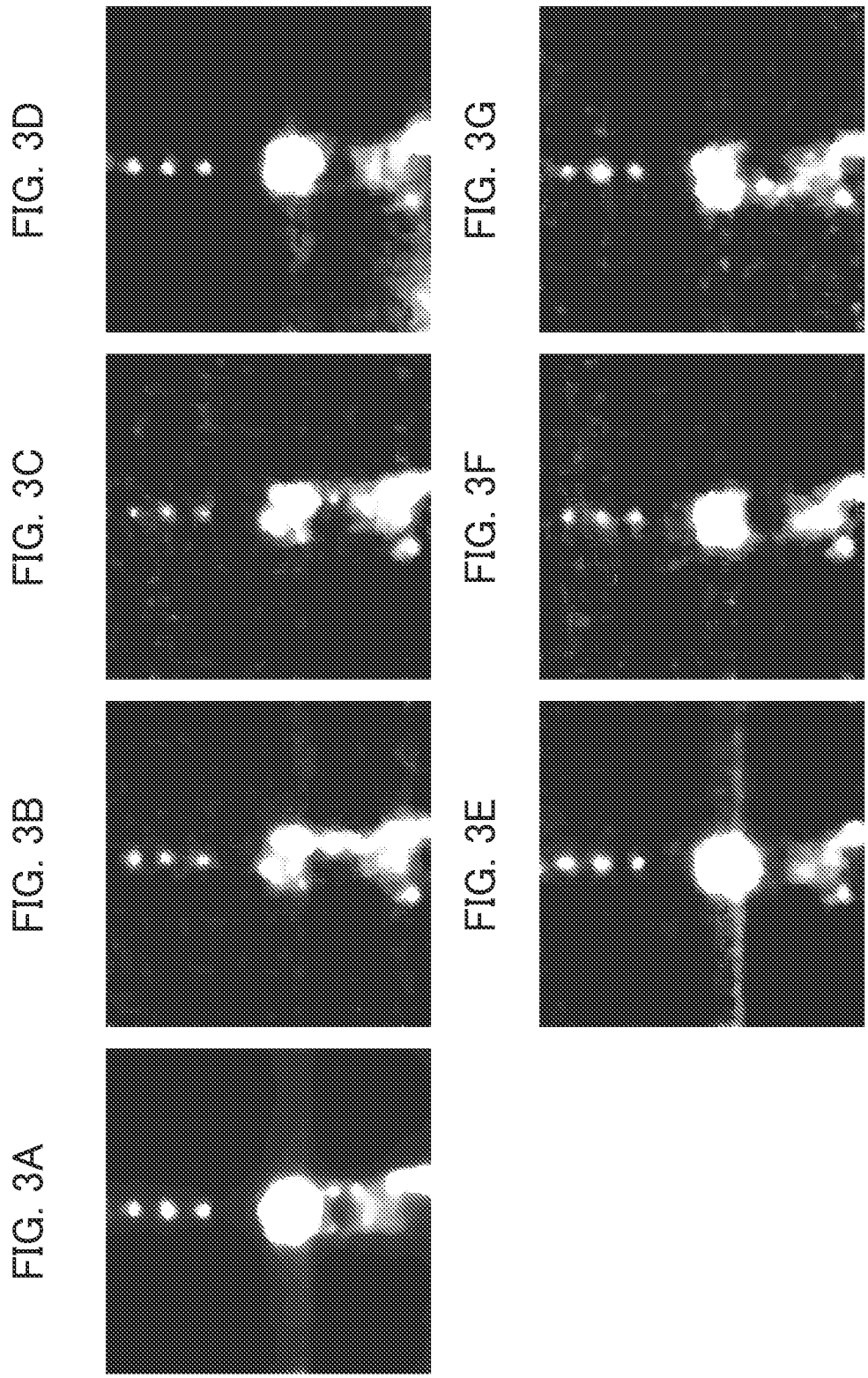

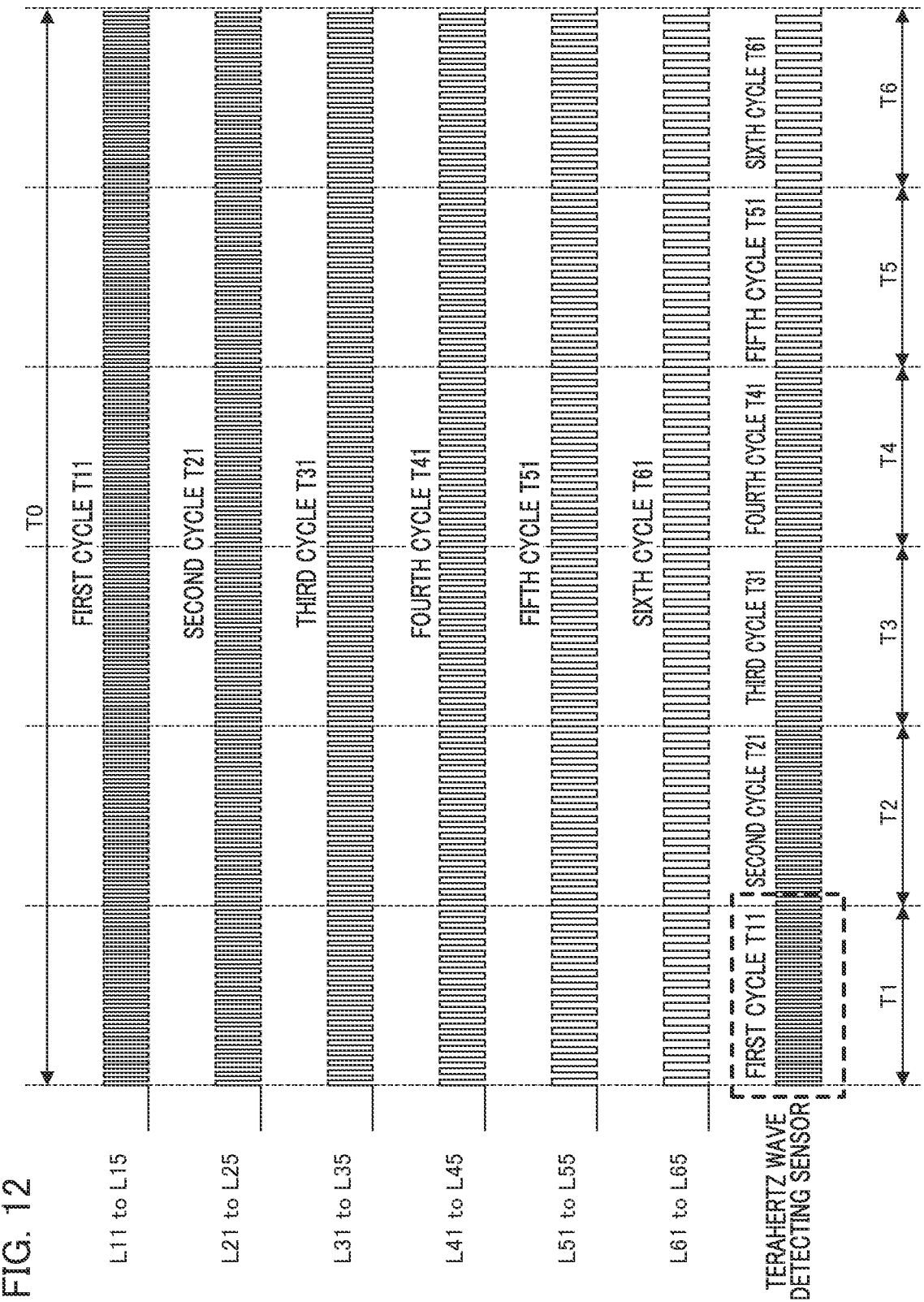

INSPECTION SYSTEM AND STORAGE MEDIUM

BACKGROUND OF THE INVENTION

Field of the Invention

The present invention relates to an inspection system that uses terahertz waves, and a storage medium.

Description of Related Art

In recent years, inspection technologies that use terahertz waves have been proposed. Terahertz waves are generally defined as electromagnetic waves having a frequency at or above 30 $GH_z$ and at or below 30 $TH_z$.

Japanese Unexamined Patent Application, First Publication No. 2020-153974 proposes an inspection system that obtains images formed by terahertz waves for detecting dangerous objects such as knives or the like, that is arranged so as to configure a portion of the surveillance system in a facility. Specifically, a configuration is disclosed in which an illumination unit that radiates terahertz waves and a camera unit that detects terahertz waves are disposed to face a subject, and from among the terahertz waves that have been radiated from the illumination unit, the components that have been reflected off of the subject are obtained.

However, in relation to the configuration of Japanese Unexamined Patent Application, First Publication No. 2020-153974, there is a problem such that the detection precision for dangerous objects is not sufficient. Therefore, an objective of the present invention is to improve the detection precision for objects and the like in an inspection system that uses terahertz waves.

SUMMARY OF THE INVENTION

One aspect of the invention relates to an inspection system comprising:
an illumination unit configured to have a plurality of illumination elements that radiate terahertz waves;
a camera unit configured to capture images of the terahertz waves that have been reflected off of an object that has been irradiated by the plurality of illumination elements; and
a control unit configured to perform control so as to make the light emission timings for the plurality of illumination elements different.

Further features of the present invention will become apparent from the following description of embodiments with reference to the attached drawings.

BRIEF DESCRIPTION OF THE DRAWINGS

FIG. 3 (A) is a diagram showing an example of a terahertz image that is obtained when all of the illumination elements have been made to emit light, and FIG. 3 (B) through (G) are diagrams explaining examples of terahertz images that are obtained when only each of the first row to the sixth row of illumination elements are made to emit light.

FIG. 5 (B) is a diagram as seen from the front end of an inspection object 150 in a state in which it has been irradiated with terahertz waves by the sixth row of illumination elements L161 to L65 having been made to emit light. FIG. 5 (C) is a diagram explaining the state of the transmission of the terahertz waves in the case in which, as in the prior art, all of the illumination elements have been made to emit light simultaneously.

FIG. 12 is a diagram explaining the light emission timing for an inspection system in a Fourth Embodiment.

DETAILED DESCRIPTION OF THE INVENTION

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1A:
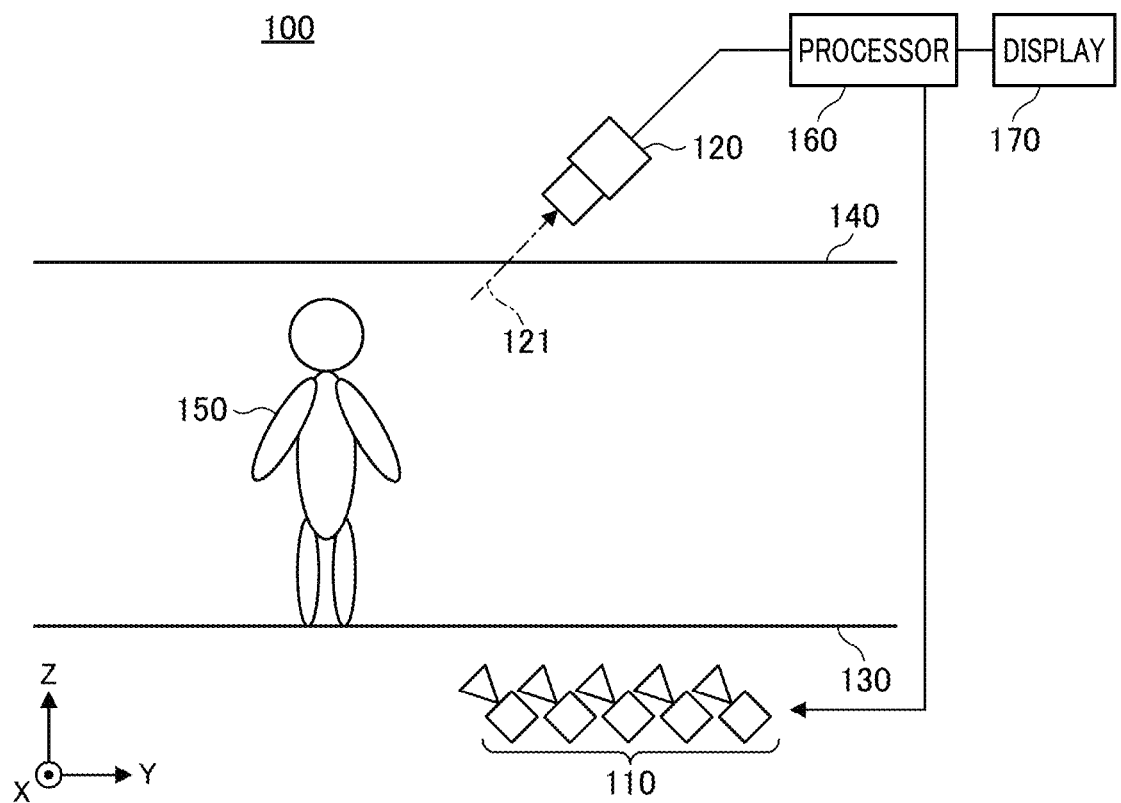
FIG. 1 (A) is a side view diagram in which an inspection system 100 in a First Embodiment is seen from the side, and FIG. 1 (B) is an overhead view diagram in which the inspection system 100, in particular, the illumination unit 110, is seen from the top of FIG. 2 (A) is diagram explaining the light emission timings for conventional inspection systems, in which the light emission timings for all of the illumination elements are equal, and FIG. 2 (B) is a diagram explaining an example of the light emission timings for the inspection system in the First Embodiment.
Figure 1B:
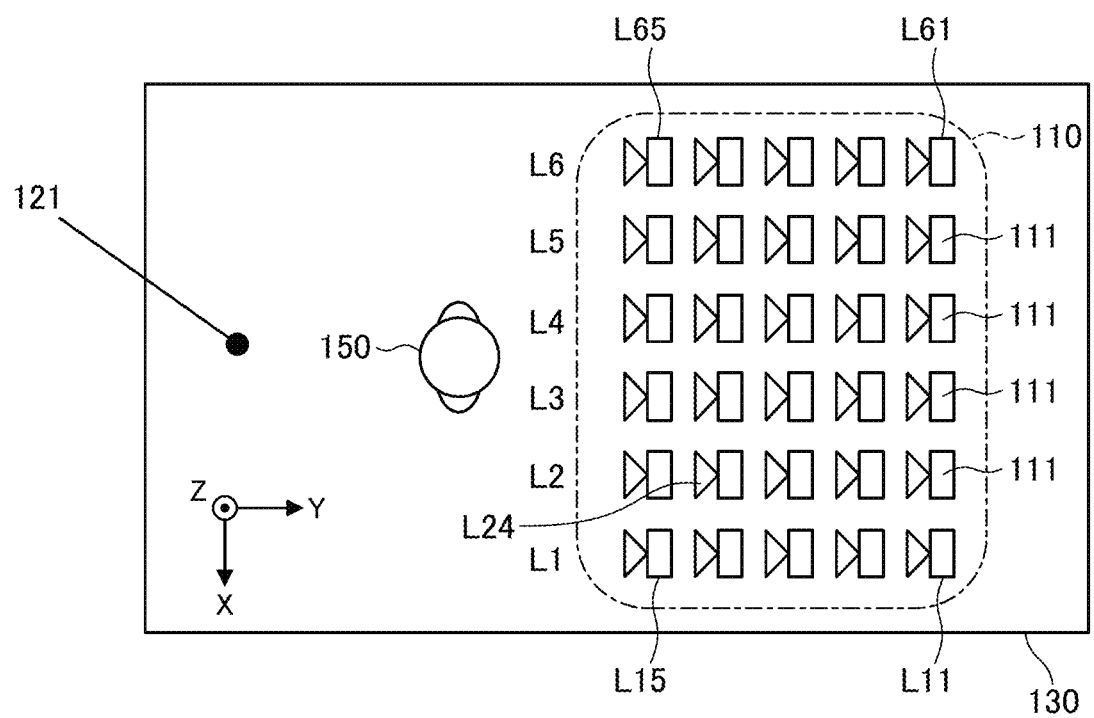

FIG. 1 is a diagram showing a configurational example of an inspection system in the First Embodiment, wherein, in FIG. 1 (A), the inspection system 100 is seen from the side, and FIG. 1 (B) is an overhead view diagram of the inspection system 100, in which, in particular, the illumination unit 110 is seen from the top.

The inspection system 100 is configured by an illumination unit 110 that radiates terahertz waves, a camera unit 120 that captures images of terahertz waves that have been reflected off of an inspection object, a processor 160, a display unit 170, and the like. The illumination unit 110 and the camera unit 120 are disposed to face an inspection object 150. Specifically, the illumination unit 110 is disposed, for example, under a floor 130, and the camera unit 120 is disposed, for example, behind a ceiling 140. Note that it is assumed that the inspection object 150 is progressing in the Y direction in the diagram.

At this time, it is preferable if the floor 130 and the ceiling 140 are configured of materials that are permeable by terahertz waves, such as, for example, polyethylene or the like. Note that the disposure of the illumination unit 110 and the camera unit 120 are not limited thereto, and the illumination unit may also be disposed on the ceiling with the camera unit disposed on the floor, or each may also be disposed on walls on opposing sides.

The terahertz waves that are radiated from the illumination unit 110 are mirror-reflected on a portion of the inspection object 150, and enter the camera unit 120. The inspection object 150 is a person or the like, however, it may also be an animal other than a human, a robot, or an article. Terahertz waves permeate cloth and the like, and therefore, it is possible for the processor 160 that has been connected to the inspection system 100 to image process images that have been obtained by the camera unit 120 and to detect dangerous objects and the like that have been hidden underneath clothing.

170 is a display unit such as an LCD or the like for displaying the detection results that have been image processed by the processor 160. Note that the processor 160 has a CPU built within to serve as a computer, and functions as a control unit that controls the operations of each unit of the entirety of the inspection system 100 based on a computer program that has been stored on a memory, which is not shown, that serves as a storage medium.

As in FIG. 1 (B), the illumination unit 110 in the First Embodiment has a plurality of illumination elements 111 that have been two dimensionally arranged along a first direction that is perpendicular to the optical axis 12 of the camera unit 120 (the direction of the X axis), and a second direction that is orthogonal to the first direction (the direction of the Y axis). In the example in FIG. 1, the illumination elements 111 are provided in 6 columns in the X direction and 5 rows in the Y direction.

Each illumination element 111 is expressed using a two-dimensional XY address, for example, the illumination element 111 that is in the second column from the downward direction to the upward direction in the diagram (the −X direction) and the fourth row from the rightward direction to the leftward direction in the diagram (the −Y direction), is referred to as L24. Below, there are also cases in which illumination elements with the same coordinates in the X direction are referred to as illumination elements located in the same column.

The inspection system in the First Embodiment is characterized by a drive method for the illumination unit 110 and the camera unit 120 that is executed by the processor 160. That is, the light emission timings are equal between the illumination elements that have been disposed in the corresponding location (the same column) along the first direction (for example, L11 to L15), and the light emission timings are different between the illumination elements that have been disposed in different locations (different columns) along the X direction (for example, L11 and L21).

That is, the light emission timings are different between the illumination elements that have been disposed in different locations (different columns) along the first direction, and the light emission timings are equal between the illumination elements that have been disposed in the corresponding locations (the same column) along the second direction. By using such a configuration, itis possible to increase the detection precision for dangerous objects. Below, an explanation will be given while making a comparison to conventional inspection systems.

Figure 2A:
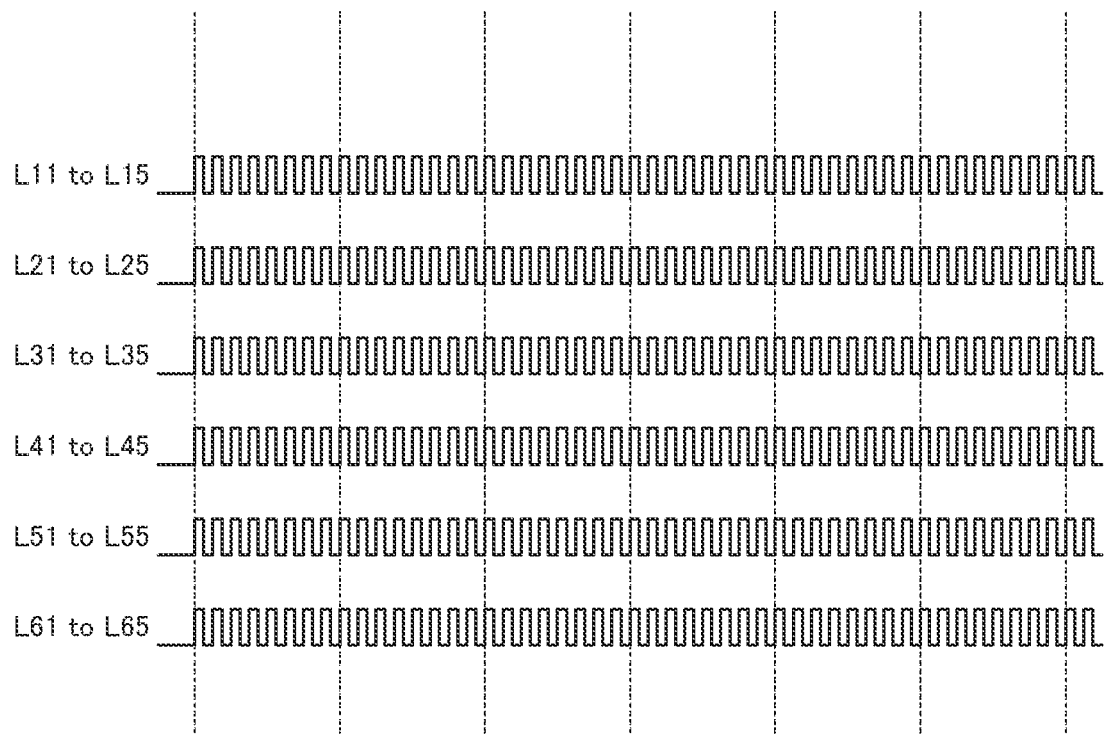
Figure 2B:
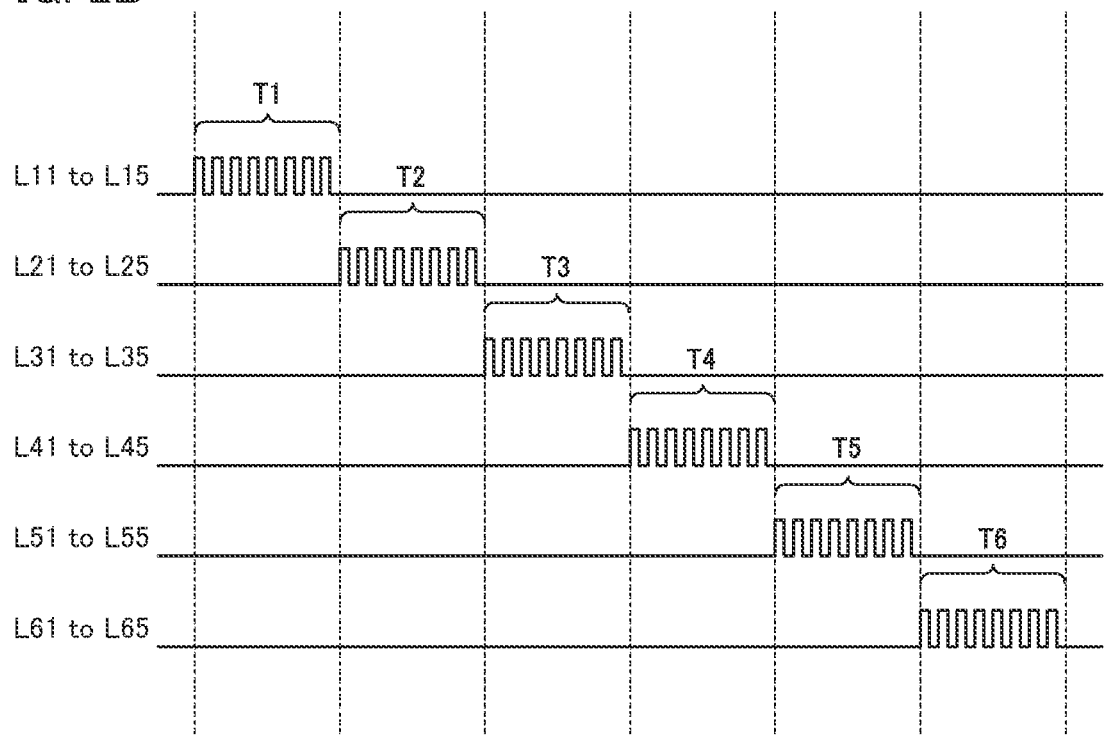

FIG. 2 (A) is a diagram explaining the light emission timings for a conventional inspection system in which the light emission timings for all of the illumination elements are equivalent, and FIG. 2 (B) is a diagram explaining an example of the light emission timings for an inspection system in the First Embodiment.

In this context, the light emission timings are, as is shown in FIG. 2 (A) and (B), the on timings for the lighting pulses that are supplied to the illumination elements. During the time periods in which the lighting pulses are at a high level, the illumination elements are on, and light emission is performed, and during time periods in which the lighting pulses are at a low level, the illumination elements are off and are extinguished.

In FIG. 2 (A) the on timings for each column of illumination elements are in agreement. In contrast, in FIG. 2 (B), the length of the time periods T1, T2, T3, T4, T5, and T6 during which the lighting pulses are supplied to the illumination elements in each row is the same, and the timings are shifted.

In conventional inspection systems, the time periods for supplying the lighting pulses that are supplied to all of the illumination elements are equal, as is shown in FIG. 2 (A), and in addition, the light emission timings are equal. Therefore, in conventional inspection systems, an image is obtained that has been formed by terahertz waves that have been radiated simultaneously from all of the illumination elements.

In contrast, in the light emission timings for the inspection system in the First Embodiment that are shown in FIG. 2 (B), the light emission timings are different for each column, and during the time period in which the illumination elements that are located in a specific column are on, the illumination elements that are located in the other columns are off. Therefore, the inspection system of the First Embodiment has a configuration in which it is possible to sequentially obtain images in a time series that have been formed by the terahertz waves that have been radiated by the illumination elements from one column.

FIG. 3 (A) is a diagram showing an example of a terahertz image that is obtained when all of the illumination elements have been made to emit light, and FIG. 3 (B) through (G) are diagrams explaining examples of terahertz images that are obtained when only one of each of the first row to the sixth row of illumination elements have been made to emit light. It is assumed that the inspection object is, for example, a person, and a thick, absorbent object has been used as the concealed article. As can be understood from the figures, in the terahertz images in each of FIG. 3 (A) through (G), a shadow from the concealed object can be observed.

However, in the case in which all of the illumination elements are made to emit light, as in FIG. 3 (A), the shadow due to the concealed article becomes small. However, in the case in which only specific columns of illumination elements are made to sequentially emit light, as in FIG. 3 (B) to (G), a larger shadow due to the concealed article can be seen. That is, as in FIG. 3 (B) to (G), it is possible to improve the detection precision for dangerous objects through obtaining terahertz images by causing only specific columns of illumination elements to emit light.

Figure 4:
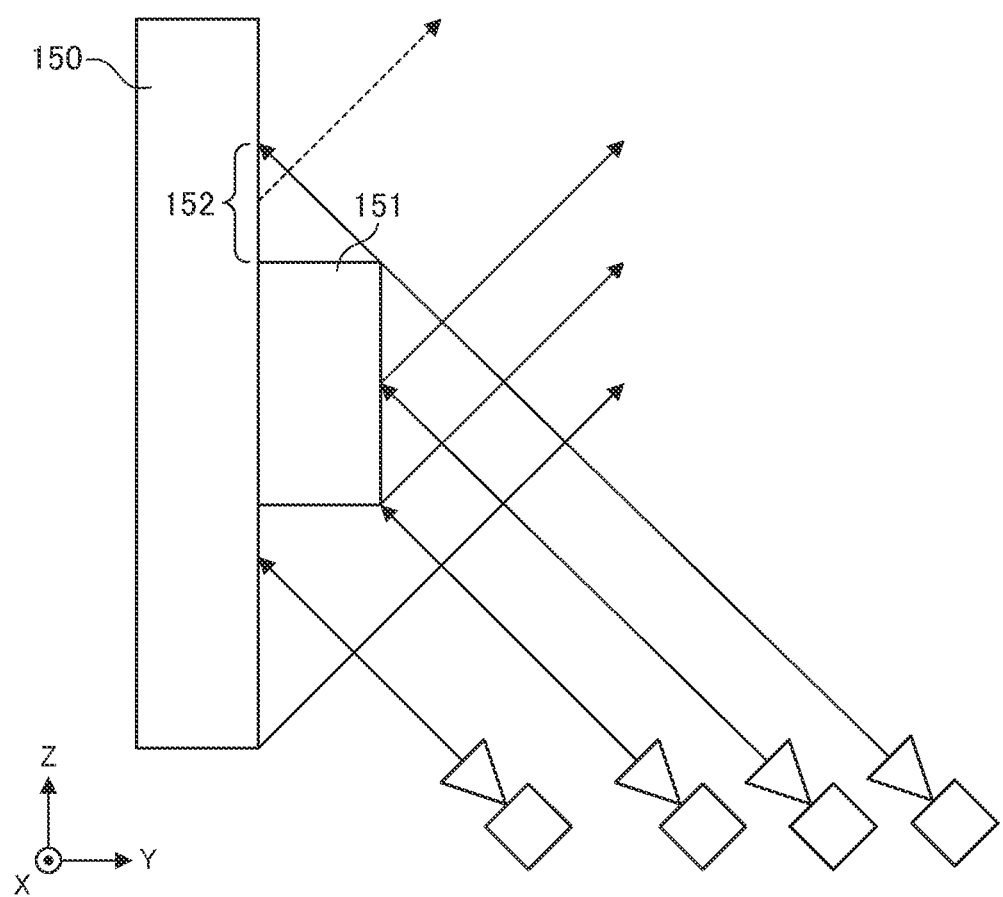
FIG. 4 is a diagram explaining the state of the transmission of the terahertz waves when an image of a thick absorbent article 151 has been captured.

Below, the reasons that the detection precision improves will be explained. FIG. 4 is a diagram explaining the state of the transmission of the terahertz waves when an image has been captured of a thick absorbent article 151. As in FIG. 4, in the case in which the inspection object and the thick absorbent article 151 are obliquely irradiated with terahertz waves, the backside of the absorbent article is not irradiated by the terahertz waves, and therefore, a shadow 152 occurs.

Figure 5A:
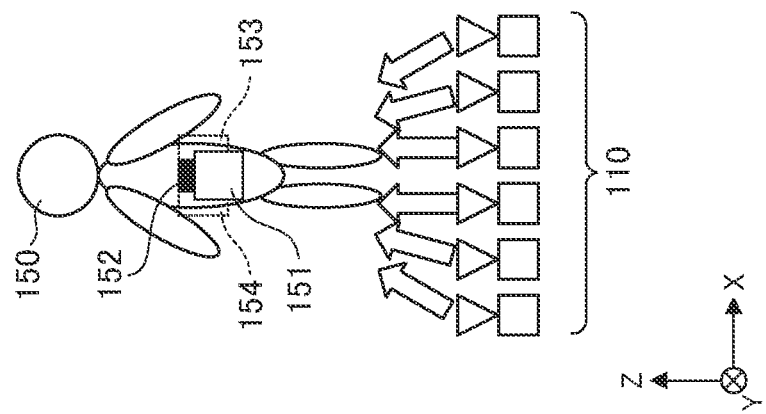
FIG. 5 (A) is a diagram as seen from the front end of an inspection object 150 in a state in which it has been irradiated with terahertz waves by the first row of illumination elements L11 to L15 having been made to emit light.
Figure 5B:
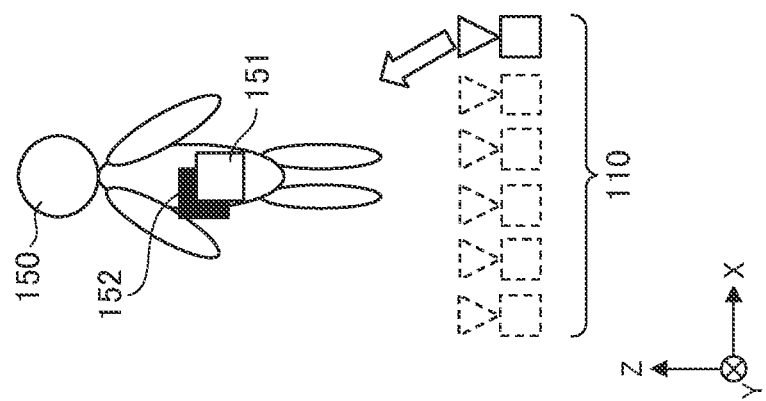
Figure 5C:
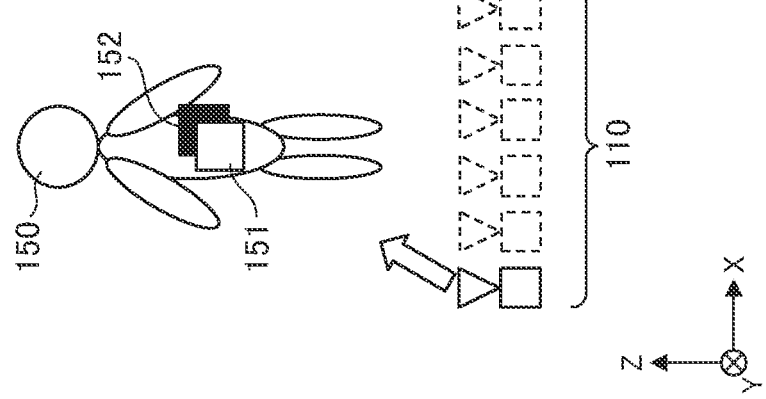

FIG. 5 (A) is a diagram showing a state in which it has been irradiated with terahertz waves by the first column of illumination elements L11 to L15 having been made to emit light as seen from the front end of an inspection object 150. In addition, FIG. 5 (B) is a diagram showing a state in which it has been irradiated with terahertz waves by the sixth column of illumination elements L161 to L65 having been made to emit light as seen from the front end of an inspection object 150.

The first column of illumination elements is inclined toward the −X direction with respect to the inspection object 150, and therefore, the shadow 152 is generated inclining toward the +X direction. In the same manner, the illumination elements in the sixth column are inclined toward the +X direction with respect to the inspection object 150, and therefore, the shadow 152 is generated inclining toward the −X direction.

FIG. 5 (C) is a diagram explaining the state of the transmission of the terahertz waves in the case in which, as in the prior art, all of the illumination elements have been made to emit light simultaneously. In FIG. 5 (C), the entirety of the illumination elements from the plurality of columns are made to emit light simultaneously, and therefore, a portion 153 of the shadow that was generated in FIG. 5 (A) inclining toward the +X direction is irradiated by the illumination elements from the fifth and sixth columns, and is lost. In the same manner, a portion 154 of the shadow that was generated in FIG. 5 (B) inclining toward the −X direction is irradiated by the illumination elements in the first and second columns, and is lost.

As a result, in the case in which all of the illumination elements are made to emit light simultaneously, as in FIG. 5 (C), the shadow 152 that is formed by the absorbent article 151 serving as the concealed article becomes smaller than in the case in which the illumination elements are made to emit light one column at a time, as in FIG. 5 (A) and (B). In contrast, in the First Embodiment, the shadow from the concealed object is made larger by obtaining a terahertz image by making only the illumination elements from a specific row emit light sequentially, and it is therefore possible to improve the detection precision for dangerous objects.

Figure 6:
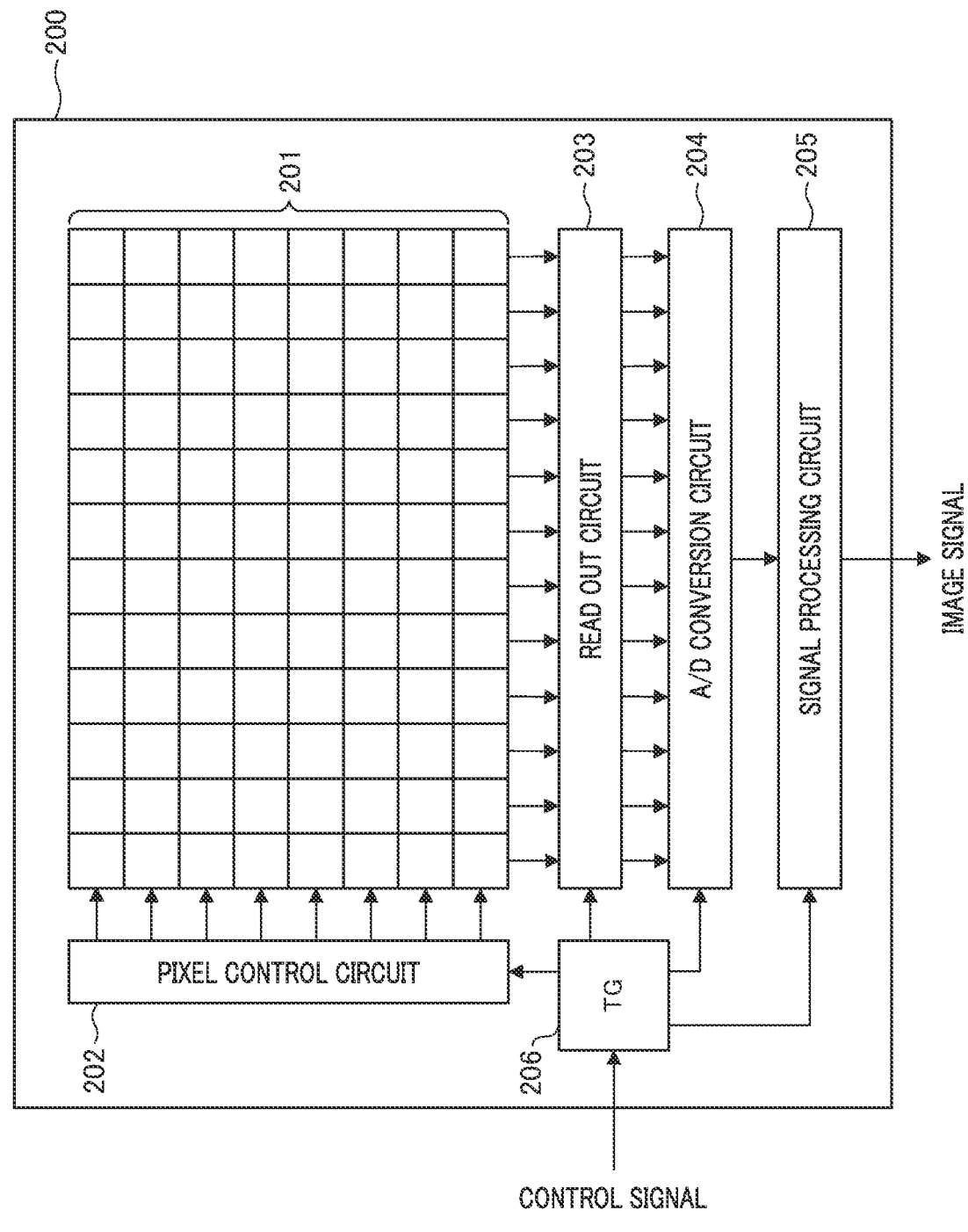
FIG. 6 is a block diagram of a terahertz wave detecting sensor 200 that configures a camera unit 120 in the inspection system 100 in the First Embodiment.

FIG. 6 is a block diagram for a terahertz wave detecting sensor 200 that configures a camera unit 120 in the inspection system 100 in the First Embodiment. The terahertz wave detecting sensor 200 is provided with a pixel region 201, a pixel control circuit 202, a read-out circuit 203, an A/D conversion circuit 204, a signal processing circuit 205, and a timing generator (T/G) 206.

The pixel control circuit 202, the read-out circuit 203, the A/D conversion circuit 204, the signal processing circuit 205, and the timing generator (T/G) 206 are provided in a peripheral circuit region, which is a region other than the pixel region 201.

A plurality of pixels are arranged in a matrix (two-dimensionally) in the pixel region 201. Note that in FIG. 6, the horizontal direction is called a row, and the vertical direction is called a column. A control signal for driving each pixel that is arranged in the pixel region 201 is output from the pixel control circuit 202.

The read-out circuit 203 is provided with a column amp, a correlated double sampling (CDS) circuit, and the like, and performs noise cancelling correction, signal amplification, and the like on pixel signals that have been read out via a signal read-out line from the pixels in a row that has been selected by the pixel control circuit 202. The A/D conversion circuit 204 converts the pixel signal from the read-out circuit 203, which is an analog signal, into a digital signal.

The signal processing circuit 205 calculates a digital signal from the A/D conversion circuit 204, and performs off-set adjustment, gain adjustment, gamma correction, noise reduction processing, and the like. The signal from the signal processing circuit 205 is input to the processor 160.

The timing generator (T/G) 206 receives control signals such as a simultaneous signal, a clock signal, or the like from the processor 160 and the like, and outputs a control signal that drives the pixel control circuit 202, the read-out circuit 203, the A/D conversion circuit 204, and the signal processing circuit 205.

Figure 7:
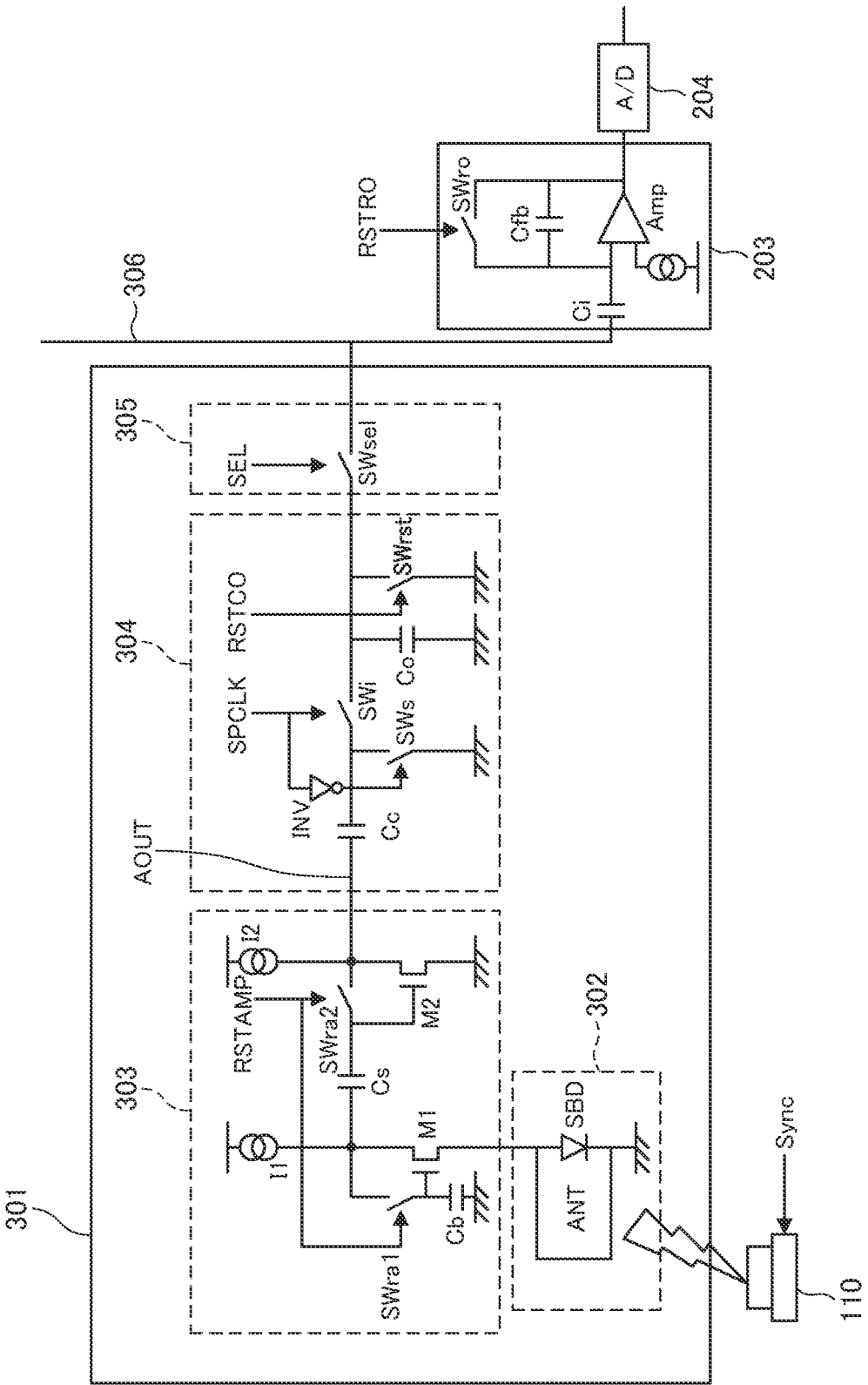
FIG. 7 is a diagram showing one example of a pixel circuit 301 that configures each pixel of a pixel region 201.

FIG. 7 is a diagram showing one example of a pixel circuit 301 that configures each pixel of the pixel region 201. The pixel circuit 301 is configured by a terahertz wave detecting unit 302, a signal amplification unit 303, a signal accumulation unit 304, a selection unit 305, and the like.

The terahertz wave detecting unit 302 generates a voltage signal by detecting terahertz waves. For example, the terahertz wave detecting unit 302 is configured by a diode SBD and an antenna ANT. A shot key barrier diode can be used as the diode SBD. Linear antennae such as a loop antenna, a dipole antenna, a meander line antenna, or the like, or planar antennae such as a patch antenna can be used as the antenna ANT.

An electrical current flows through the antenna ANT that has received the terahertz waves based on the intensity of the terahertz waves, and the terahertz wave detecting unit 302 is able to generate a voltage signal in response to the intensity of the terahertz waves by changing the inter-terminal voltage of the diode SBD.

Terahertz waves are emitted from the illumination unit 110 that serves as a terahertz light source. The on/off state for the light emission from the illumination unit 110 is controlled by a control signal Sync. The control signal Sync is generated by an external control controller (not illustrated), and is input to the illumination unit 110. Alternatively, the control signal Sync may also be generated by the timing generator (T/G) 206 of the terahertz wave detecting sensor 200.

The voltage signal that was detected by the terahertz wave detecting unit 302 is amplified in the signal amplification unit 303, and input to the signal accumulation unit 304. The voltage signal that was detected by the terahertz wave detecting unit 302 may also be input to the signal accumulation unit 304 as is. However, amplifying the signal enables suppressing the effects from noise that occurs in the circuits after the signal accumulation unit 304 and of improving the S/N. The signal amplification unit 303 uses, for example, a gate ground amplification circuit, or a source ground amplification circuit.

In the example in FIG. 7, the output from the terahertz wave detecting unit 302 is connected to the source terminal of an NMOS transistor M1, and the drain terminal of the NMOS transistor M1 is connected to an electric current source I1. In addition, a switch SWra1 is connected between the gate terminal and the drain terminal of the NMOS transistor M1. The gate terminal is reset to a voltage that is determined according to the electric current that is flowing in the NMOS transistor M1 by turning on the switch SWra1 and causing a short circuit between the gate terminal and the drain terminal.

This voltage that is reset is dependent on the threshold voltage and drive capability of the NMOS transistor M1, and is operable so as the cancel the irregularities of the NMOS transistor M1 for each pixel. A bias capacitor Cb is connected to the gate terminal of the NMOS transistor M1, and is operable so as to retain the reset voltage when the switch SWra1 is off. Such circuit connections for the NMOS transistor M1 configure a gate ground amplification circuit in which the source terminal of the NMOS transistor M1 is the input terminal, and the drain terminal is the output terminal.

In addition, the source of the NMOS transistor M1 is connected to an anode of the diode SBD in the terahertz wave detecting unit 302, and the electric current from the electric current source I1 is used as a driving electric current for the diode SBD. According to such a configuration, the bias electric current from the NMOS transistor M1 of the gate ground amplification circuit and the driving electric current for the diode SBD are both used, and it is possible to decrease the electrical current consumption of the pixel circuit 301.

The drain terminal of the NMOS transistor M1 is connected to the gate terminal of a NMOS transistor M2 via a capacitor Cs. The source terminal of the NMOS transistor M2 is connected to the electric potential, and the drain terminal of the NMOS transistor M2 is connected to an electric current source I2. A switch SWra2 is connected between the gate terminal and the drain terminal of the NMOS transistor M2. The gate terminal is reset to a voltage that is determined based on the electric current that is flowing through the NMOS transistor M2 by turning the switch SWra2 on and causing a short circuit between the gate terminal and the drain terminal.

This voltage that is reset is dependent on the threshold voltage and driving potential of the NMOS transistor M2, and is operable so as to cancel the irregularities of the NMOS transistor M2 for each pixel. Note that in the example in FIG. 7, a control signal RSTAMP controls both the switch SWra1 and the switch SWra2. However, the switch SWra1 and the switch SWra2 may also be controlled by separate control signals.

A source ground amplification circuit in which the gate terminal of the NMOS transistor M2 is an input terminal, and the drain terminal is an output terminal is configured by the circuit connections of the NMOS transistor M2. The output from the gate ground amplification circuit created by the NMOS transistor M1 is thereby inversion amplified by the source ground amplification circuit created by the NMOS transistor M2.

Note that it is sufficient if the signal amplification unit 303 is able to amplify the voltage signal from the terahertz wave detecting unit 302, and an amplification circuit other than the gate ground amplification circuit or the source ground amplification circuit that have been described in the first embodiment may also be applied.

The output from the signal amplification unit 303 is input to the signal accumulation unit 304. A high frequency wave cut filter (not shown) may be connected to the output unit of the signal amplification unit 303, and noise may also be removed from the signal from the signal amplification unit 303. As the high frequency cut filter, for example, a capacitor may be connected between the output unit of the signal amplification unit 303 and a fixed potential. It also may be made such that the cut off frequency value for the filter can be changed by switching between a plurality of capacitors using a selection switch.

The signal accumulation unit 304 generates a differential voltage signal for the output voltage signal from the signal amplification unit 303 at a certain timing and the output voltage signal from the signal amplification unit 303 at a timing that is different than this timing. In addition, an operation to accumulate the voltage that has been determined based on this differential voltage signal is performed, and an integration operation is performed by repeating this operation.

In the example in FIG. 7, the output of the signal amplification unit 303 is connected to one terminal of a clamp capacitor Cc in the signal accumulation unit 304. The other terminal of the clamp capacitor Cc is mutually connected to one terminal of a switch Sws and one terminal of a switch SWi. The other terminal of the switch Sws is connected to a fixed potential (in FIG. 7, a ground potential).

The other terminal of the switch SWi is connected to one terminal of an accumulation capacitor Co. The other terminal of the accumulation capacitor Co is connected to a fixed potential (in FIG. 7, a ground potential). One terminal of a switch SWrst is connected to one terminal of the accumulation capacitor Co. The other terminal of the switch SWrst is connected to a fixed potential (In FIG. 7, a ground potential). One terminal of the accumulation capacitor Co becomes the output for the signal accumulation unit 304, and is input to the selection unit 305.

The switch Swi is controlled so as to be turned on/off by a control signal SPCLK. The switch SWs is controlled by the inverse signal of the control signal SPCLK. That is, when the switch SWi is turned on, the switch Sws is turned off, and Alternatively, when the switch SWs is turned on, the switch SWi is turned off.

When the switch SWi and the switch SWs are switched between being on and off, it is preferable that they are driven so that a time period in which both the switch SWi and the switch SWs are turned on is not possible, and a time period in which both are turned off is possible. In addition, the on/off state of the switch SWrst is controlled by a control signal RSTCO, and operates so as to reset the voltage for one terminal of the accumulation capacitor Co.

The selection unit 305 is operable so as to output the voltage for the accumulation capacitor Co in the signal accumulation unit 304 to a signal read-out line 306 to serve as a pixel signal when the control signal SEL is input thereto. The signal read-out line 306 is mutually connected to the outputs from the pixel circuits 301 that are disposed in the same column in the pixel region 201. Pixel signals are output by the selection unit 305 sequentially selecting the pixel circuit 301 for each row.

The signal read-out line 306 is connected to the read-out circuit 203. The read-out circuit 203 is provided with an amplification circuit Amp, an input capacitor Ci, a feedback capacitor Cfb, and a switch SWro for each column. The signal read-outline 306 is input to the first input terminal of the amplification circuit Amp via the input capacitor Ci.

A feedback capacitor Cfb is connected between the first input terminal and the output terminal of the amplification circuit Amp. In addition, both terminals of the feedback capacitor Cfb are short circuited and reset by turning the switch SWro on. The switch Swro is controlled by a control signal RSTRO.

A fixed potential is input to the second input terminal of the amplification circuit Amp. Such a read-out circuit 203 configuration makes it possible to cancel noise from the pixel signal, and to amplify the pixel signal. Note that the read-out circuit 203 is not limited to the above-described configuration, and a subtraction circuit that outputs the difference between the pixel signal including the noise and the noise itself, or the like, may also be used.

The output from the read-out circuit 203 is input to the A/D conversion circuit 204, and the analog pixel signal from the read-out circuit 203 is converted into a digital signal. An A/D conversion circuit 204 may be provided for each column, or one A/D conversion circuit 204 may be disposed for all of the columns, and each column may be A/D converted in a time division manner.

Figure 8:
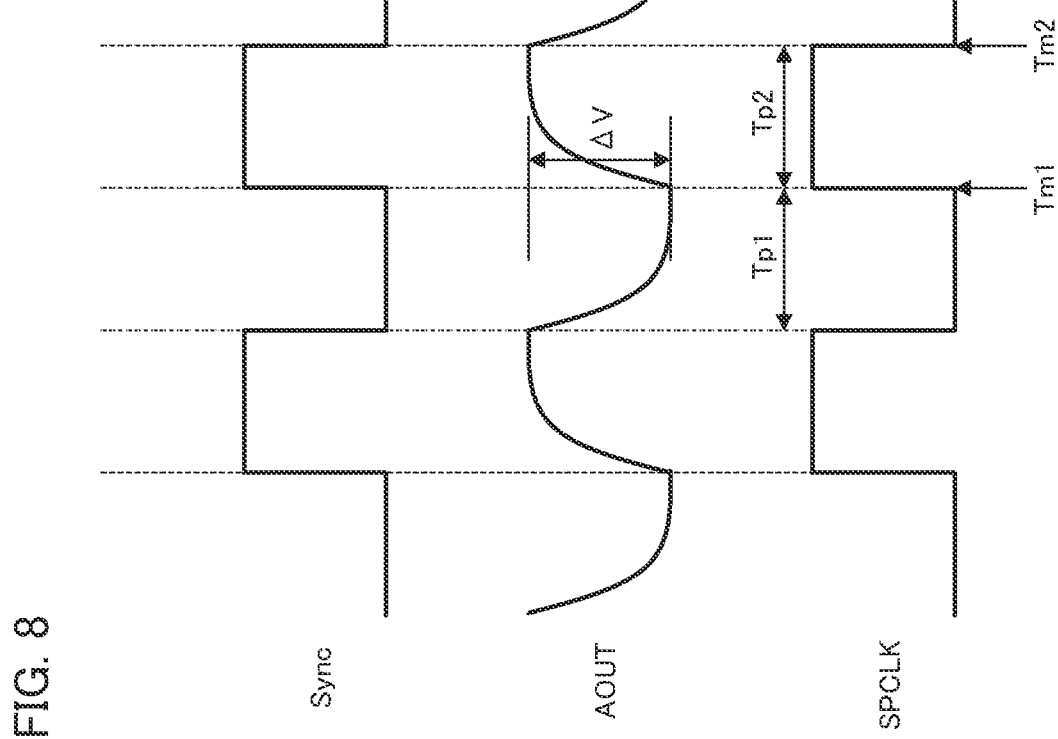
FIG. 8 is a diagram showing one example of a timing chart explaining the operations of a signal accumulation unit 304.

The detection operations of the inspection system 100 will be explained in detail with reference to FIG. 8. FIG. 8 is a diagram showing one example of a timing chart explaining the operations of the signal accumulation unit 304.

In FIG. 8, the control signal Sync is the control signal that turns the light emission of the terahertz light source on and off, and the H (high) level and L (Low) level are repeated in predetermined cycle. In the First Embodiment, it is assumed that the terahertz light source emits light when this is at the H level.

The control signal SPCLK is a signal that controls the switch SWi, and the H level and the L level are repeated in a predetermined cycle in synchronization with the control signal Sync. In the first Embodiment, it is assumed that the switch SWi is turned on when this is at the H level.

Thus, when the control signal SPCLK is at the L level, the switch SWs is turned on. This is synchronized such that when the control signal Sync is at the H level, the control signal SPCLK is also at the H level, and when the control signal Sync is at the L level, the control signal SPCLK is also at the L level.

An output wave form AOUT is an output voltage signal from the signal amplification unit 303. The rise and fall of the waveform AOUT is in joint operation with the on/off states for the light emission of the terahertz light source. When the control signal Sync is at the H level, the terahertz light source emits light, and thus, a terahertz wave is detected by the terahertz wave detecting unit 302, generating a voltage signal, and this voltage signal is amplified and output by the signal amplification unit 303.

Therefore, when the command signal Sync becomes the H level, the output wave form AOUT rises, and the voltage is increased to a level based on the intensity of the terahertz wave. When the control signal Sync is at the L level, the light emission for the terahertz light source is turned off, and thereby, no terahertz waves are detected by the terahertz wave detecting unit 302, the output waveform AOUT falls, and the voltage is decreased to the output level at which the light emission of the terahertz waves is turned off.

In the First Embodiment, the time period for the L level of the control signal SPCLK is called a first time period Tp1, and the time period for the H level is called a second time period Tp2. In addition, the timing during which the first time period Tp1 switches to the second time period Tp2 is called a first timing Tm1, and the timing during which the second time period Tp2 switches to the first time period Tp1 is called a second timing Tm2.

The operations of the signal accumulation unit 304 will be explained using FIG. 7 and FIG. 8. First, a first operation that is performed during the first time period Tp1 will be explained.

During the first time period Tp1, the control signal Sync is at the L level, and thereby, light emission from the illumination unit 110 is turned off, and the output wave form AOUT is also reduced. When the light emission from this terahertz light source is turned off, the output waveform AOUT is applied to one terminal of the clamp capacitor Cc, and the switch SWs is turned on, and thereby, a fixed potential (ground potential) is applied to the other terminal of the clamp capacitor Cc.

During the first timing Tm1, when the control signal SPCLK switches from the L level to the H level, the switch SWs is turned off, and the switch SWi is turned on. Thereby, the other terminal of the clamp capacitor Cc is connected to one terminal of the accumulation capacitor Co. The interterminal voltage of the clamp capacitor Cc at this time retains the potential difference between the voltage signal (a first voltage signal) for the output waveform AOUT during the first timing Tm1 and the fixed potential (ground potential).

Next, a second operation that is performed during the second time period Tp2 will be explained. During the second time period Tp2, the control signal Sync is at the H level, and thereby, the terahertz light source emits light, and the output waveform AOUT increases. This output waveform AOUT is applied to one terminal of the clamp capacitor Cc, and one terminal of the accumulation capacitor Co is connected to the other terminal of the clamp capacitor Cc, and thereby, the voltage of the accumulation capacitor Co also increases due to the voltage increase of the output waveform AOUT.

When the voltage increase amount for the output waveform AOUT is made $\Delta V$, the voltage increase amount $\Delta V'$ for the accumulation capacitor Co (referred to below as the accumulated voltage $\Delta V'$) is represented by $\Delta V' = \Delta V \times Cc/(Co+Cc)$, and becomes a voltage value that is correlated with $\Delta V$. In this context, Cc is the capacity value for the clamp capacitor Cc, and Co is the capacity value for the accumulation capacitor Co.

During the second timing Tm2, the control signal SPCLK switches from the H level to the L level, the switch SWi, which connects the clamp capacitor Cc and the accumulation capacitor Co, is turned off, and a differential voltage signal $\Delta V$ is determined. When the voltage signal for the output waveform AOUT for this second timing Tm2 is made a second voltage signal, the differential voltage signal $\Delta V$ becomes the differential voltage signal for the first voltage signal and the second voltage signal.

In this manner, the series of operations consisting of the first operation and the second operation are one accumulative operation, which is an operation that generates the differential voltage signal $\Delta V$ for the first voltage signal and the second voltage signal, and accumulates the accumulation voltage $\Delta V'$, in which this differential voltage signal $\Delta V$ has been capacity-divided, in the accumulation capacitor Co.

This accumulation operation is repeated multiple times. In the case in which the accumulation operation is repeated N times, the voltage for the accumulation capacitor Co is increased by $N \times \Delta V'$. N is the number of times accumulation is performed, and this operation is an integration operation that accumulates the accumulation voltage $\Delta V'$ N times. In addition, the voltage of this accumulation capacitor Co is read out to serve as the pixel signal.

In the First Embodiment, in FIG. 8 the first time period Tp1 and the second time period Tp2 are shown as being the same length (a 50% duty ratio). However, they may also be different lengths. The range for the optimal duty ratio is 30% to 70%.

In addition, the timing for the rise/fall of the control signal SPCLK and the timing for the rise/fall of the control signal Sync are disclosed as being the same timing. However, the timings may also be made different taking into consideration delays due to the configuration of the drive circuit or parasitic impedance.

When the voltage of the output waveform AOUT during the first timing T1 (the first voltage signal) is the smallest voltage, and the voltage of the output waveform AOUT during the second timing Tm2 (the second voltage signal) is the largest voltage, the differential voltage signal $\Delta V$ is at its largest. Therefore, making the first timing Tm1 the timing when the output waveform AOUT takes the smallest voltage, and the second timing Tm2 the timing when the output waveform AOUT takes the largest voltage are the optimal conditions from the point of view of S/N.

However, in order to obtain the differential voltage signal $\Delta V$ by detecting the terahertz waves that have been light emitted from the terahertz light source by the terahertz wave detecting sensor, the first timing Tm1 and the second timing Tm2 do not need to be made as was described above. It is sufficient if the first timing Tm1 is the time period in which the light emission for the terahertz light source is off, and it is sufficient if the second timing Tm2 is the time period in which the terahertz light source is emitting light.

Thus, the signal accumulation unit 304 is operative so as to integrate the output voltage signal which has been converted during the timing in which the light emission for the terahertz light source is turned off, and the accumulation voltage $\Delta V'$ that is determined by the differential voltage signal $\Delta V$ for the output voltage signal that has been converted during the timing in which the terahertz light source is emitting light.

In the First Embodiment, the differential voltage signal $\Delta V$ is generated by the signal accumulation unit 304, which consists of a capacitator and a switch. However, the differential voltage $\Delta V$ may also be generated using another method. For example, A/D converting and storing the first voltage signal and the second voltage signal on a memory, and calculating the differential signal by digital signal processing is given as an example. In addition, it is possible to store this differential signal on a memory and then perform integration by sequential summing.

As has been explained above, the detection operation of the terahertz wave detecting sensor in the First Embodiment is a process in which the pixel signal is obtained by an integration operation in which an accumulation voltage $\Delta V'$ that is determined from the differential voltage signal $\Delta V$ from the first timing Tm1 and the second timing Tm2, is repeatedly accumulated.

Figure 9:
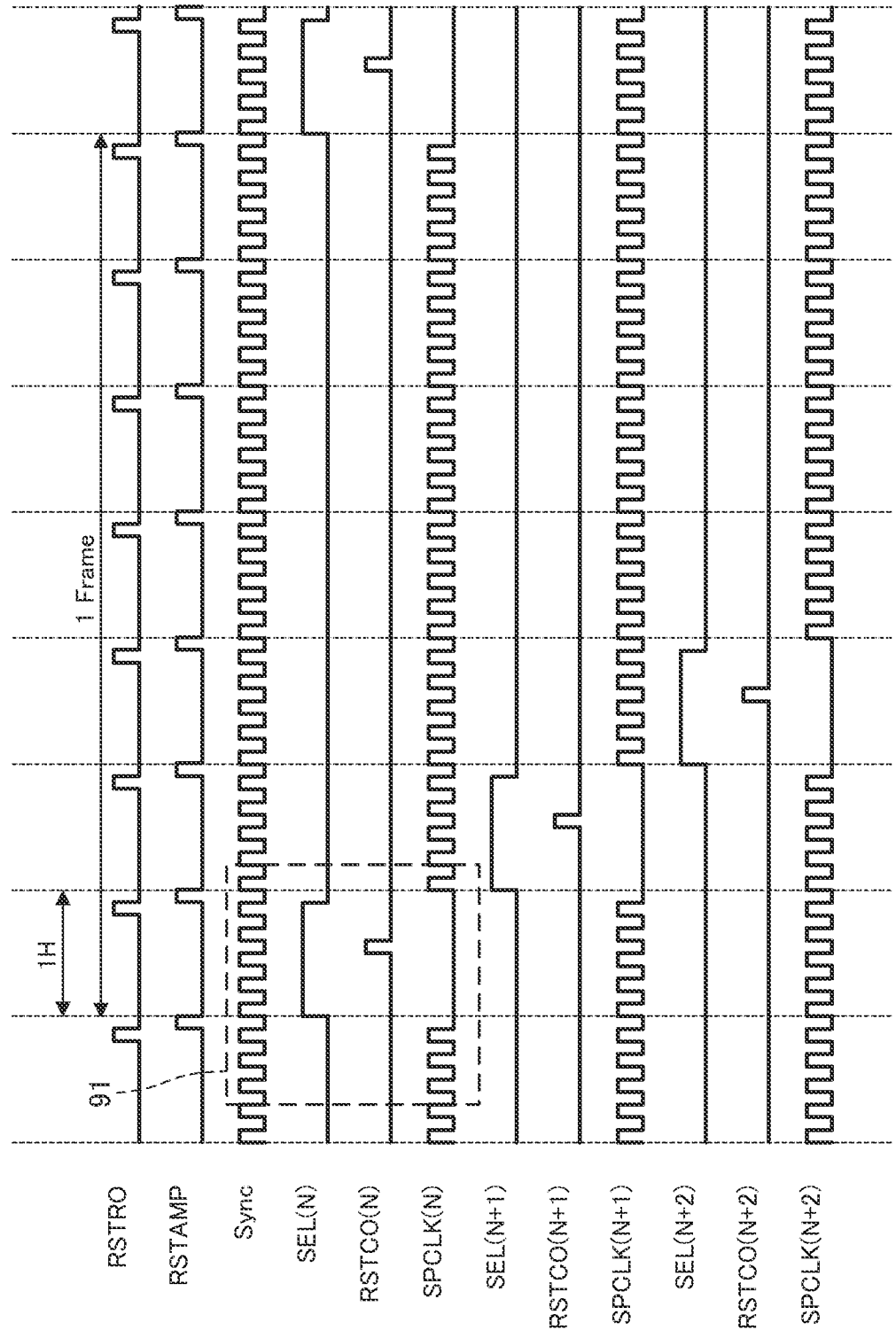
FIG. 9 is a timing chart explaining a drive method for a terahertz wave detecting sensor in the First Embodiment.

FIG. 9 is a timing chart explaining a drive method for a terahertz wave detecting sensor in the First Embodiment. The plurality of pixels that are arranged in a matrix (two-dimensionally) sequentially read out the output signals for the pixels for each row, and therefore, the control signals SEL, RSTCO, and SPCLK that were shown in FIG. 7 are mutually provided to the pixel circuits 301 for each row.

In FIG. 9, SEL (N), RSTCO (N), and SPCLK (N) are provided to the pixel circuit for the Nth row. SEL (N+1), RSTCO (N+1), and SPCLK (N+1) are provided to the pixel circuit for the N+1 row. SEL (N+2), RSTCO (N+2), and SPCLK (N+2) are provided to the pixel circuit for the N+2 row.

Figure 10:
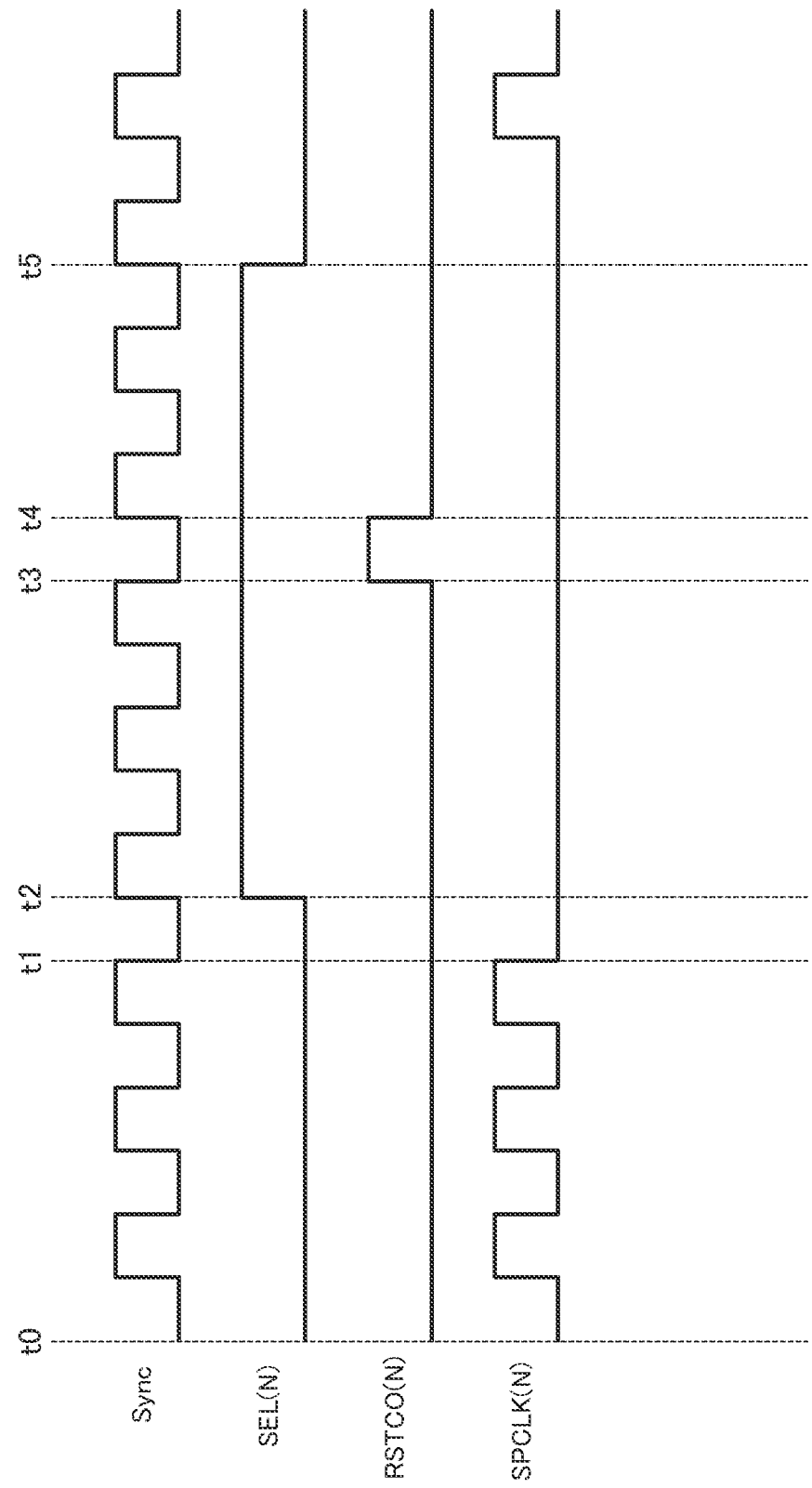
FIG. 10 is a timing chart explaining the operations of a pixel circuit for an Nth row.

FIG. 10 is a timing chart explaining the operations of a pixel circuit for an Nth row. FIG. 10 expands the region 91 in FIG. 9 that is surrounded by the dotted line, and shows the waveforms for the control signals Sync, SEL (N), RSTCO (N), and SPCLK (N).

Firstly, the operations of the pixel circuit for the Nth row will be explained using FIG. 10. As has been described above, the control signal Sync is a signal that controls the on/off state of the light emission for the illumination unit 110, and the H level and the L level are repeated in a fixed cycle.

The time t0 is an arbitrary time when the accumulation operation that was explained using FIG. 8 is performed multiple times. The accumulation operation is performed until the time t1, and the control signal SPCLK (N) repeats the H level and L level in synchronization with the control level Sync.

When the SPCLK (N) is at the H level, the first operation that was explained using FIG. 8 is performed. The timing during which SPCLK (N) switches from the L level to the H level corresponds to the first timing Tm1, and the output voltage of the signal amplification unit 303 at this time (corresponding to the previously described first voltage signal) is retained in the clamp capacitor Cc.

When the SPCLK (N) is at the L level, the second process that was explained using FIG. 8 is performed. The timing during which SPCLK (N) switches from the H level to the L level corresponds to the second timing Tm2.

The accumulation voltage $\Delta V'$, in which the differential voltage signal $\Delta V$ for the output voltages from the signal amplification unit 303 for each of the first timing Tm1 and the second timing Tm2 has been capacity divided, is accumulated in the accumulation capacity Co. After the accumulation operation has been performed in a predetermined time period in this manner, the read-out operation begins from the time t2.

That is, during the time t2, the control signal SEL (N) becomes the H level, the switch SWsel in FIG. 7 is turned on, and output of the voltage based on the electric charge that has been accumulated in the accumulation capacitor Co, which serves as the pixel signal, to the signal read-out line 306 begins. The pixel signal for the pixel circuit 301 is read out to the read-out circuit 203 during the time period from the time t2 to the time t3 via the signal read-out line 306.

During the time t3, the control signal RSTCO becomes the H level, the switch SWrst is turned on, and the voltage of the accumulation capacitor Co is reset to a fixed voltage (In FIG. 7, the ground capacity). During the time t4, the control signal RSTCO becomes the L level, the switch SWrst is turned off, and the accumulation capacitor Co retains the reset voltage.

During the time period from the time t4 to the time t5, the voltage that has been retained in the accumulation capacitor Co is read out to serve as the reset signal. The read-out circuit 203 performs noise cancelling by generating a differential signal for the pixel signal that was read out during the time period from the time t2 to the time t3 and the reset signal that was read out during the time period from the time t4 to the time 5. The read-out circuit 203 amplifies the differential signal using the amplification circuit Amp and outputs this to A/D conversion circuit 204 of the latter.

During the time t5, the control signal SEL becomes L, and the switch SWsel is turned off. In this series of operations, the operation that is performed during the time period in which the control signal SEL from the time t2 to the time t5 is at the H level, is a pixel read-out operation.

During the time period for this read-out operation, the H level and the L level for the control signal Sync are repeated at a fixed cycle. However, the SPCLK (N) is fixed at the L level, and therefore, the accumulation capacitor Co retains a fixed voltage. After the time t5, an accumulation operation is performed again in the same manner as during the time period from time t0 to time t1, and the above-described operation is repeated.

The processes for the entirety of the pixel region will be explained using FIG. 9. The time period until the control signal SEL (N) for the Nth row becomes the H level and the control signal SEL (N+1) for the next row, the N+1 row, becomes the H level is made a one-line scanning time period (1H). After the read-out operation for the Nth row, the read-out operation for the N+1 row is performed during the next one-line scanning time period.

Next, after the read out-operation for the N+1 row, the read-out operation for the N+2 row is performed during the next one-line scanning time period. In this manner, driving is performed so as to sequentially read out the pixel signals for each row. During the time period in which a read-out operation is not being performed in each row, the accumulation operation is performed in the pixels for that row. Sequential read-out is performed for each row, and the time period until a read-out operation is performed again for the same row is made one-frame time period (one frame).

The control signal RSTRO is a signal that resets the read-out circuits 203 that have been disposed in each column. There is one H level time period during a one-line scanning time period, and the read-out circuits 203 for each column are reset during the H level time period. After the reset signal that has been accumulated in the accumulation capacitor during the read-out operations for the pixels in each row has been read out, an H level time period is provided.

During this timing, the signal read-outline 306 is fixed to the reset signal by the read-out circuits 203 being reset, and therefore, it is possible to perform the read-out operation without being affected by the pixel signal for the previous row.

The control signal RSTAMP is a signal that resets the signal amplification unit 303 of the pixel signal 301. In the First Embodiment, there is one H level time period that is mutually input to all of the pixel circuits 301 of the pixel region 201 during each one-line scanning time period. During the H level time period, the signal amplification unit 303 is reset.

The timing during which the H level of the control signal RSTAMP is input is converted to a voltage signal by normally detecting terahertz waves, and therefore, it is preferable that the control signals SPCLK (N), SPCLK (N+1), and SPCLK (N+2) are at the L level.

An operation may also be performed in which, during the one-frame time period, the H level for the control signal RSTAMP is input only once. In addition, although the control signals SPCLK (N), SPCLK (N+1), and SPCLK (N+2) repeat the H level and the L level during the accumulation operation, this may also be input for each L level time period therefor.

In addition, this may also be mutually provided to the pixel circuits for each row in the form of the RSTAMP for the Nth row (N), the RSTAMP for the N+1 row (N+1), and the RSTAMp for the N+2 row (N+2) in the same manner as was performed with the control signals SEL, RSTCO, and SPCLK. In this case, after the read-out operations for each row, the H level for the control signal RSTAMP for that row will be input before the accumulation operation.

Above, in the method that was explained using FIG. 6 to FIG. 10, the shadow from the concealed object is made larger, and it is possible to improve the detection precision for dangerous objects by driving the illumination elements 11 and the terahertz wave detecting unit 302 in synchronization while driving the illumination elements 111 at different timings for each column.

Second Embodiment

Note that, in FIG. 2 (B), an example is shown in which the length of the time periods T1, T2, T3, T4, T5, and T6 during which lighting pulses are provided for the illumination elements in each column is the same and the timings are shifted. However, in the Second Embodiment, control is performed so that the time periods T1, T2, T3, T4, T5, and T6 during which the lighting pulses are provided to the illumination elements are different for the illumination elements in each column.

For example, the illumination efficiency for the illumination elements that are close to the front of the inspection object 150 is high, and therefore, more efficient radiation of terahertz waves is possible when the light emission frequency for the illumination elements for the third column and the fourth column is high, and the light emission frequency for the illumination elements in the first column and the sixth column is low.

That is, it is more efficient to make the light emission frequency higher for the illumination elements that are located relatively toward the inside along the first direction than the illumination elements that are located relatively toward the outside (periphery) along the first direction.

Figure 11A:
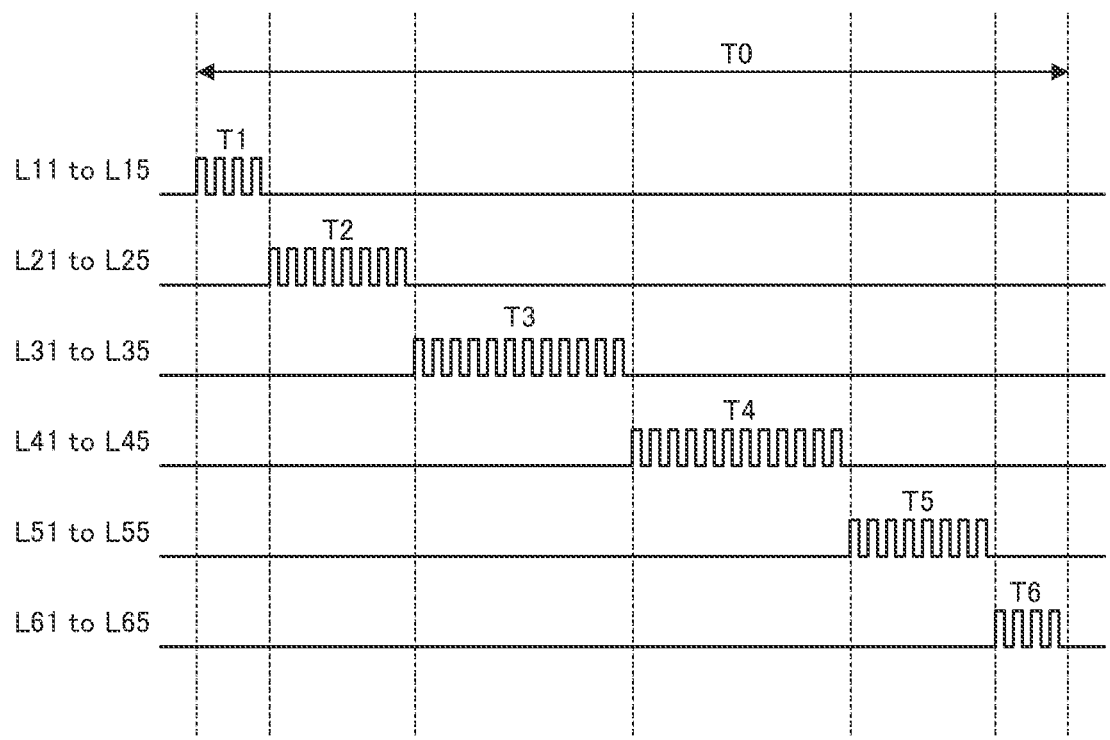
FIG. 11 (A) is a diagram showing one example of a method for increasing the light emission frequency in a Second Embodiment, and FIG. 11 (B) is a diagram showing another example of a method for increasing the light emission frequency in a Third Embodiment.
Figure 11B:
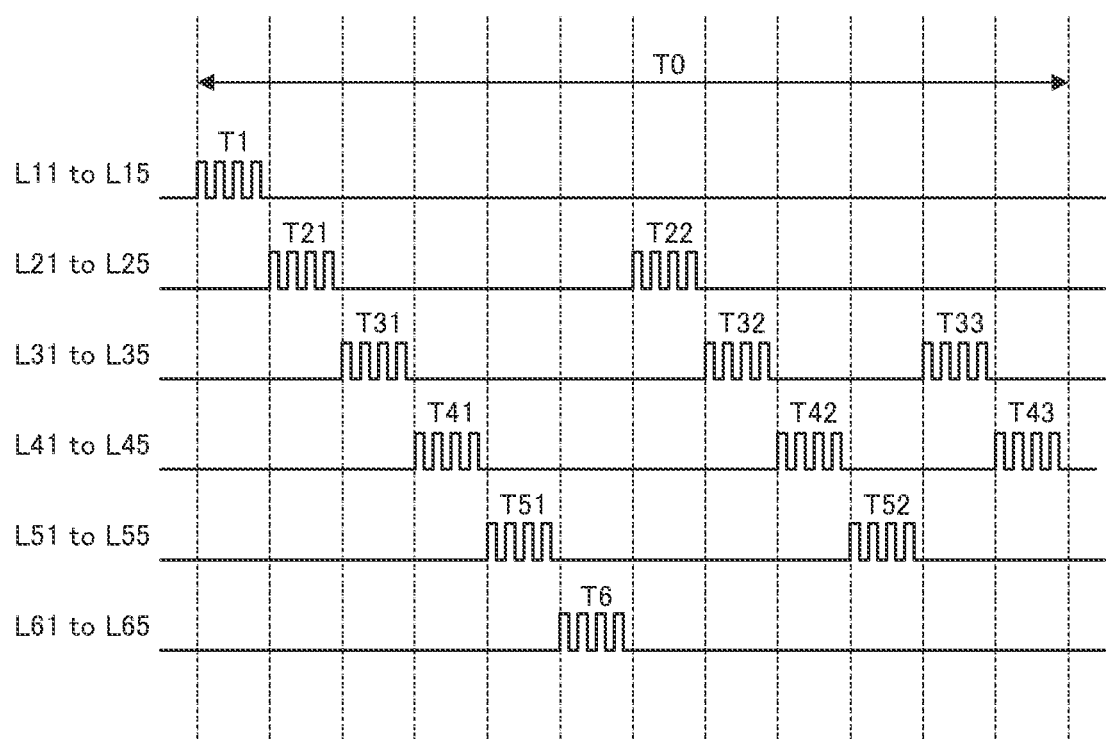

In the Second Embodiment, a method such as the one in, for example, FIG. 11 (A) is used as the method for increasing the light emission frequency. FIG. 11 (A) is a diagram showing one example of a method for increasing the light emission frequency in a Second Embodiment.

That is, in FIG. 11 (A), when the time periods in which the lighting pulses are provided to the illumination elements for row 1 to row 6 are respectively made T1 to T6, T1=T6, T3=T5, T3=T4, and T1<T2<T3.

Third Embodiment

FIG. 11 (B) is a diagram showing another example of a method for increasing the light emission frequency in a Third Embodiment. In FIG. 11 (A), the time periods in which the lighting pulses are provided to the columns on the inside are made longer than the time periods in which the lighting pulses are provided to the columns on the outside.

That is, as in FIG. 11 (B), it may also be made such that the time periods in which the lighting pulses are provided to the illumination elements for each column are made respectively the same, and the interval between time periods in which the lighting pulses are provided during a unit period TO are made larger for the columns on the inside and shorter for the columns on the outside, and the number of times they are provided may also be increased.

In the example in FIG. 11 (B), the time periods T1 and T6 during which lighting pulses are provided to the illumination elements for the column 1 and the column 6 during the unit time period are respectively onetime. In relation to this, the time periods in which lighting pulses are provided to the illumination elements in the column 2 are the two times of T21 and T22, and the time periods in which lighting pulses are provided to the illumination elements for the column 5 are also the two times of T51 and T52.

In contrast, the time periods in which lighting pulses are provided to the illumination elements for the column 3 are the three times of T31, T32, and T33, and the time periods in which lighting pulses are provided to the illumination elements for the column 4 are also made the three times of T41, T42, and T43.

In the Second Embodiment and the Third Embodiment in FIG. 11 (A), and (B), the total number of times that the lighting pulses are on during the unit time period TO (the light emission frequency) is larger for the columns on the inside than for the columns on the outside. Alternatively, the sum total of the time periods in which the lighting pulses are on (the total light emission time period) is longer for the columns on the inside than for the columns on the outside.

Note that it can also be said that in the Second Embodiment and the Third Embodiment in FIG. 11 (A), and (B), the non-light emission time period for the illumination elements that are located relatively toward the inside along the first direction are shorter than the non-light emission time periods for the illumination elements that are located relatively toward the outside (periphery) along the first direction.

That is, the light emission frequency (total light emission time period) for the illumination elements that are located relatively close to the inspection object on the inside along the first direction (X axis) is made larger (longer) than the light emission frequency (total light emission time period) for the illumination elements that are located relatively more to the outside than the inspection object along the first direction (X axis).

In contrast, in the case in which the user would like to emphasize the shadow from the concealed object, as can be understood from FIG. 5 (A), and (B), it is preferable to make the light emission frequency high for the illumination elements for each of the first column and the sixth column. That is, it is better to make the light emission frequency (total light emission time period) higher (longer) for the illumination elements that are located relatively more towards the inside, which is close to the inspection object, along the first direction (X axis) than the light emission frequency (total light emission time period) for the illumination elements that are located relatively more toward the outside than the inspection object along the first direction (X axis).

In this case, it can also be said that it is better to make the non-light emission time period for the illumination elements that are located relatively toward the inside along the first direction shorter than the non-light emission time period for the illumination elements that are located relatively more toward the outside (periphery) along the first direction.

Furthermore, for example, the light emission timings between adjacent columns may also be made equal. As can be understood from FIG. 3, the difference in the shape of the shadows that can be made by the concealed object between the illumination of adjacent columns is small. Therefore, for example, the light emission timing may also be changed for every second row.

Fourth Embodiment

Only the drive method for the illumination elements 111 of the inspection system in the Fourth Embodiment differs from the inspection systems shown in the First Embodiment to the Third Embodiment. FIG. 12 is a diagram explaining the light emission timing for an inspection system in the Fourth Embodiment.

In the inspection system in the Fourth Embodiment, the illumination elements 111 output terahertz waves with a light emission pattern that is different for each column. The light emission patterns are, for example, the on and off cycles for the illumination elements. The on state is the state in which the illumination elements emit light, and the off state is the state in which the illumination elements do not emit light.

In FIG. 12, the cycle during which lighting pulses are provided to the lighting elements L11 to L15 in the first column is made the first cycle T11, and the cycles during which lighting pulses are provided to the illumination elements for the second column to the sixth column are respectively made the second cycle T21 to the sixth cycle T61. In addition, in the Fourth Embodiment, it is made such that T11<T21<T31<T41<T51<T61.

That is, the light emission patterns differ between the light emission elements that have been disposed in differing locations along the first direction, and the light emission patterns are the same between the light emission elements that have been disposed in the corresponding locations (in the same column) along the first direction.

In addition, in the camera unit, the terahertz wave detecting sensor sequentially switches between the on/off pattern for detecting terahertz waves in a cycle. The on state is the timing during which signal components are detected in the terahertz wave detecting sensor (Tm2 in FIG. 8), and the off state is the timing during which background components are detected (Tm1 in FIG. 8).

In the Fourth Embodiment, the on/off cycle for the terahertz wave detecting sensors for each of the time periods T1 to T6 each sequentially switch between the first cycle T11 to the sixth cycle T61 respectively. Note that in this context, the time periods T1 to T6 are equal.

By using such a configuration, the same as in the First to Third Embodiments, it is possible to obtain a terahertz image of a state in which only the illumination elements for a specific column have been made to emit light, and it is possible to improve the detection precision for dangerous objects. Below, the reason for this will be explained.

Figure 13:
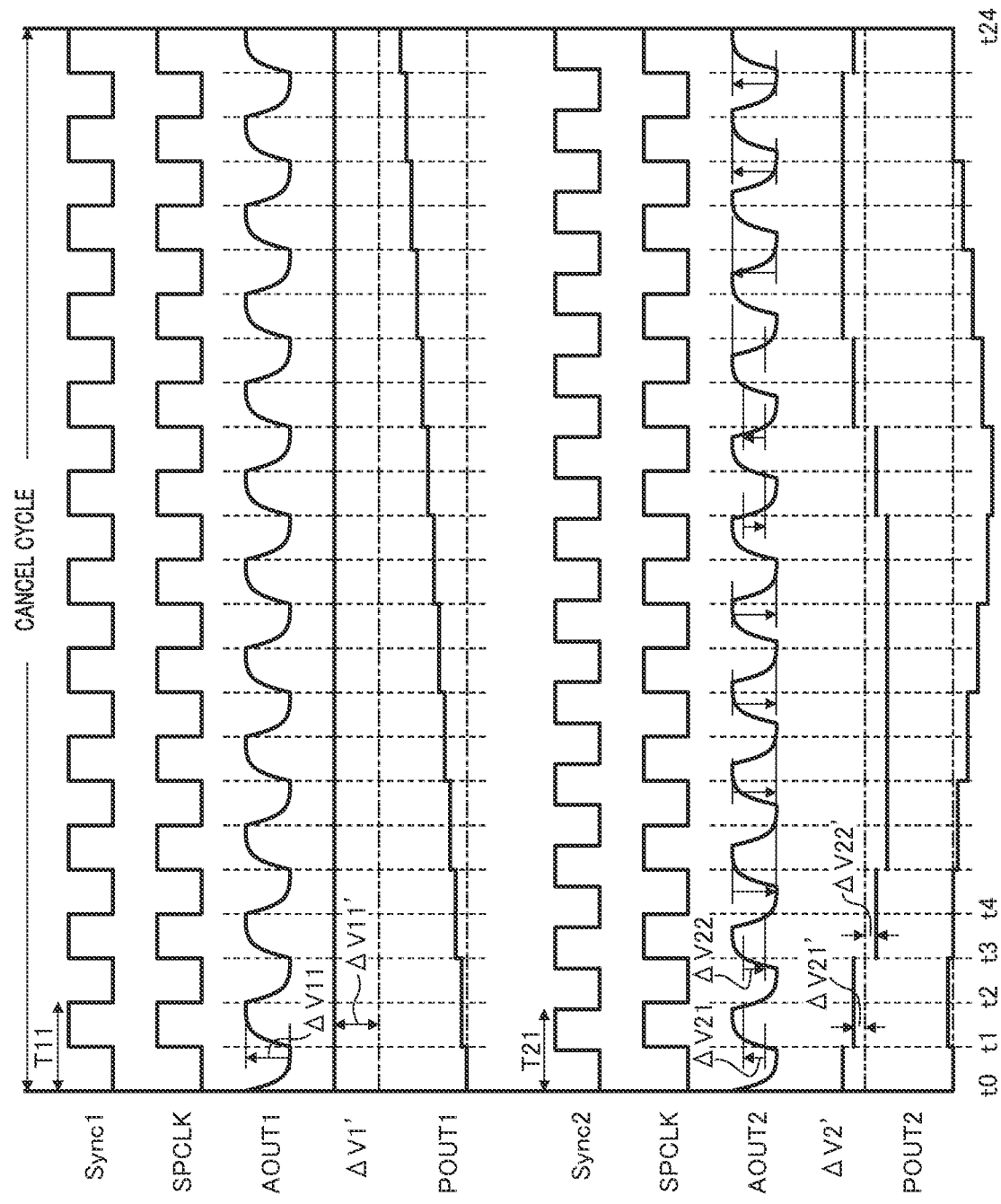
FIG. 13 is a timing chart for a time period 101, which is encircled by a dotted line in FIG. 12, and during which the terahertz wave detecting sensor is driven during a first cycle T11.

FIG. 13 is a timing chart for a time period 101, which is encircled by a dotted line in FIG. 12, during which the terahertz wave detecting sensor is driven in a first cycle T11.

Using FIG. 13, it will be explained that during the time period 101, the terahertz wave detecting sensor is able to cancel the output from the terahertz waves that have entered it from the illumination elements other than the illumination elements L11 to L15 (L21 to L25 as an example in FIG. 13) to zero.

A control signal Sync1 is a control signal that controls the on/off state for the light emission of the illumination elements L11 to L15, and the H level and the L level are repeated during the first cycle T1. In the same manner, a control signal Sync 2 is a control signal that controls the on/off of the light emission for the illumination elements L21 to L25, and the H level and the L level are repeated during the second cycle T21. Light is emitted at the time of the H level, and light emission is turned off at the time of the L level.

The control signal SPCLK is a control signal that controls the on/off state of the switch SWi and the on/off state of the switch SWs in the pixel circuits 301 of the terahertz wave detecting sensor, and the H level and the L level repeat during the same first cycle T11 as the control signal Sync1.

An output waveform AOUT 1 is the output waveform from the signal amplification unit 303 of the pixel circuit of the terahertz wave detecting sensor when terahertz waves have entered it from the illumination elements L11 to L15. The rise and fall of the output waveform AOUT 1 are in joint operation with the on/off state of the light emission for the illumination elements L11 to l15.

When the control signal Sync1 is at the H level, the output waveform AOUT1 rises, and the voltage increases to a level corresponding to the intensity of the terahertz wave. When the control signal Sync1 is at the L level, the output waveform AOUT1 falls, and the voltage decreases to the output level when the terahertz wave is off.

An accumulation voltage ΔV1' represents the voltage that changes based on one accumulation operation with respect to the accumulation capacitor Co in the signal accumulation unit 304 of the terahertz wave detecting sensor when terahertz waves have entered from the illumination elements L11 to L15. An output waveform POUT1 represents the voltage of the accumulation capacitor Co in the signal accumulation unit 304 that is accumulated by an integration operation of the terahertz wave detecting sensor.

The control signal Sync1 and the control signal SPCLK are synchronized during the same first cycle T11, and therefore, the voltage (corresponding to the previously described first voltage signal) of the output waveform AOUT1 when the control signal SPCLK rises (the first timing Tm1 in FIG. 8) becomes approximately the same value regardless of the cycle.

At the same time, the voltage (corresponding to the previously described second voltage signal) of the output waveform AOUT1 when the control signal SPCLK falls (the second timing Tm2 in FIG. 8) has approximately the same value regardless of the cycle. Therefore, in all of the accumulation operations, the differential voltage signal for the two voltages becomes approximately the same value, ΔV11, and therefore, the accumulation voltage ΔV1' becomes the approximately fixed voltage ΔV11'.

In FIG. 13, the voltage at the starting point of the arrow that is shown on the output waveform AOUT 1 represents the previously described first voltage signal, and the voltage at the end point of the arrow represents the previously described second voltage signal. The length of the arrow represents the size of the differential voltage signal for the two voltages, and is approximately the same length in all of the accumulation operations. Thus, the output waveform POUT1 is increased by just an approximately fixed voltage for each accumulation operation that is repeated by the integration operation.

In FIG. 13, the $12^{th}$ cycle for the control signal Sync1 is the same time period as the $13^{th}$ cycle for the control signal Sync 2. The cycle with the length of the lowest common denominator between the first cycle T11 and the second cycle T21 is defined as the cancel cycle.

In the Fourth Embodiment, it is sufficient if the cycle for the control signal Sync1 and the cycle for the control signal Sync2 are different. Further optimally, it is sufficient if the cycle for the control signal Sync1 is outside of the integer multiples of the cycle for the control signal Sync2, and the cycle for the control signal Sync2 is outside of the integral multiples of the cycle for the control signal Sync1.

The output waveform AOUT2 is the output waveform from the signal amplification unit 303 of the pixel circuits for the terahertz wave detecting sensor when terahertz waves have entered from the illumination elements L21 to L25. The rise and fall of the output waveform AOUT1 are in joint operation with the on/off state of the light emission for the illumination elements L21 to L25.

When the control signal Sync2 is at the H level, the output waveform AOUT2 rises, and the voltage increases to a level corresponding to the intensity of the terahertz waves. When the control signal Sync2 is at the L level, the output waveform AOUT 2 falls, and the voltage for the terahertz waves decreases to the output level for the off state.

The accumulation voltage ΔV2' represents the voltage that changes based on one accumulation operation with respect to the accumulation capacitor Co in the signal accumulation unit 304 of the terahertz wave detecting sensor when terahertz waves have entered it from the illumination elements L21 to L25. The output waveform POUT2 represents the voltage of the accumulation capacitor Co in the signal accumulation unit 304 that is accumulated due to the integration operation of the terahertz wave detecting sensor.

The control signal Sync2 and the control signal SPCLK have different cycles, and therefore, the differential voltage signal of the output waveform AOUT 2 changes with each accumulation operation. That is, the voltage for the output waveform AOUT2 (corresponding to the previously described first voltage signal) when the control signal SPCLK rises (the first timing Tm1 in FIG. 8) becomes a different value for each cycle.

In the same manner, the voltage for the output waveform AOUT2 (corresponding to the previously described second voltage signal) when the control signal SPCLK falls (the second timing Tm2 in FIG. 8) also becomes a different value for each cycle. The differential voltage signal for the two voltages changes, and therefore, the voltage for the accumulation voltage ΔV2' changes with each accumulation operation.

In the same manner as the arrow for the output waveform AOUT 1, in FIG. 13, the voltage for the starting point of the arrow that is shown on the output waveform AOUT2 represents the previously described first voltage signal, and the voltage for the endpoint of the arrow represents the previously described second voltage signal. The length of the arrow represents the size of the differential voltage signal for the two voltages, and the length changes with each accumulation operation. In addition, the direction of the arrow represents the positive and negative parts of the differential voltage.

The time t0 is the timing during which the fall of the control signal Sync1 and the fall of the control signal Sync2 are the same, and is the start time for the cancel cycle.

Counting from the time to, the first rise timing of the control signal SPCLK is the time t1, and the first fall timing is the time t2. Counting from the time t0, the second rise timing for the control signal Sync2 is the time t3, and the second fall timing is the time t4.

During the time t3, the voltage of the output waveform AOUT2 increases compared to during the time t1, and during the time period t4, the voltage of the output waveform AOUT2 decreases compared to during the time period t2. Thus, the differential voltage signal ΔV22 for the output waveform AOUT2 during the time t3 and the time t4 is smaller than the differential voltage ΔV21 for the output waveform AOUT2 during the time t1 and the time t2.

Figure 15:
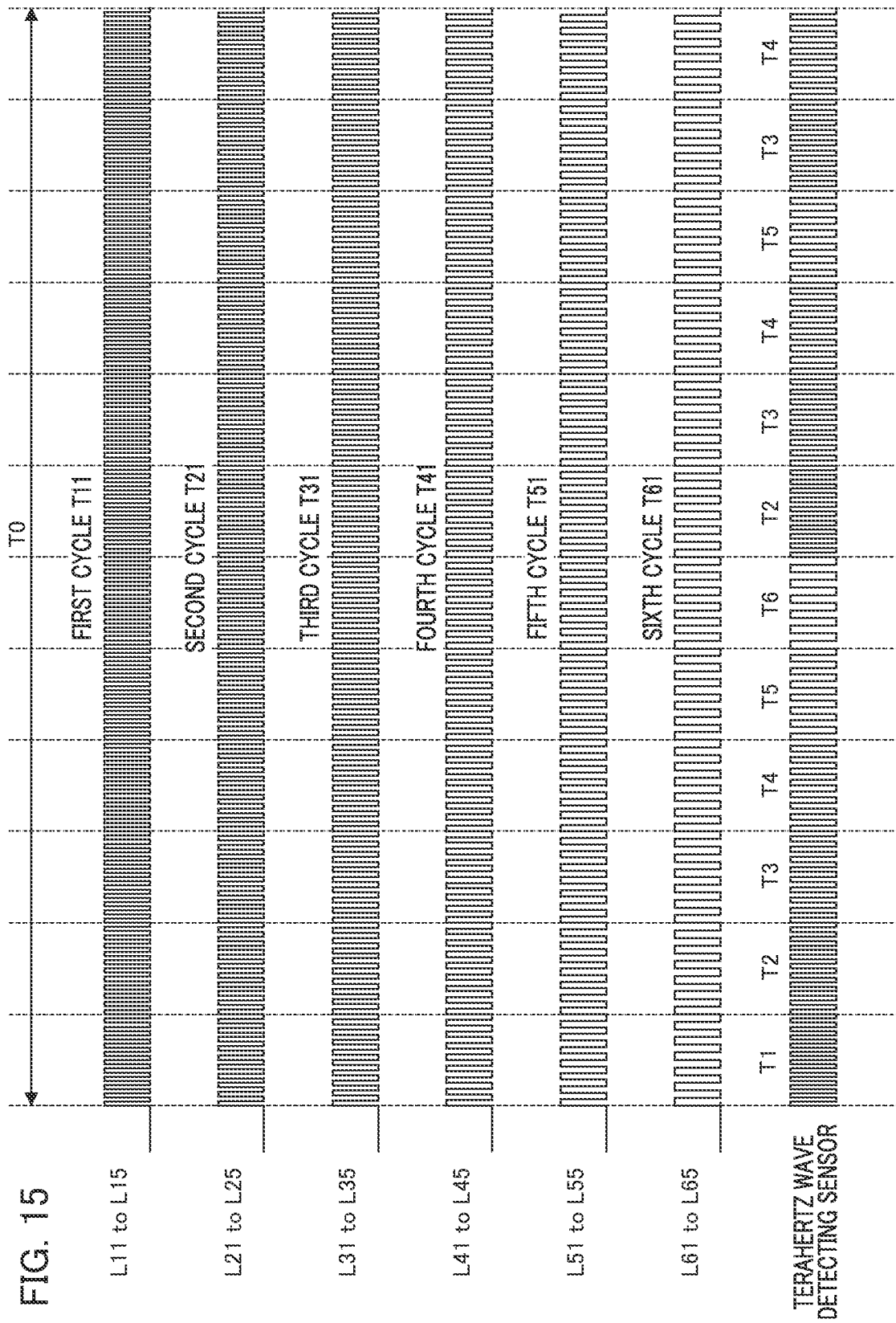
FIG. 15 is a diagram explaining a further separate example of the light emission timings for an inspection system in a Sixth Embodiment.

Therefore, the accumulation voltage ΔV2' is reduced. In FIG. 15, the accumulation voltage that corresponds to the differential voltage signal ΔV21 is ΔV21', and the accumulation voltage that corresponds to the differential voltage signal ΔV22 is ΔV22'. The accumulation voltage ΔV22' is smaller than the accumulation voltage ΔV21'.

In addition, the voltage of the output waveform AOUT2 during the time t4 becomes smaller than the voltage of the output waveform AOUT2 during the time t3, and the differential voltage signal ΔV23 becomes negative, and therefore, the accumulation voltage ΔV2' becomes negative. At this time, the previous accumulation operation becomes the reverse of the direction of the arrow, which represents the differential voltage going from positive to negative.

In addition, the voltage of the output waveform AOUT2 during the first timing Tm1 changes along with the repeated rising and falling of the control signal SPCLK2.

Due to such an operation, the accumulation voltage ΔV2' has time periods in which it becomes a positive voltage and time periods in which it becomes a negative voltage, and as is represented by the output waveform POUT2, when the accumulation voltage ΔV2' is integrated during the cancel cycle by the integration process, it becomes zero. (It is zero during the time to, and also becomes zero again during the time t24.).

Thus, during the time period in which the terahertz wave detecting sensor is driven during the first cycle T11, it is possible to cancel the output from the terahertz waves that have entered it from the illumination elements L21 to L25 to zero.

Other combinations can also produce the same phenomenon, and therefore, in the case in which the light emission cycle for the illumination elements and the detection cycle of the terahertz wave detecting sensor are different, the output due to the terahertz waves will be cancelled.

That is, using the inspection system from the Fourth Embodiment, it is possible to detect only terahertz waves from the illumination elements that emit light during the same cycle as the drive cycle for the terahertz wave detecting sensor. As a result, it is possible to obtain a terahertz image for a state in which only the illumination elements for a specific column have been made to emit light, and it is possible to improve the detection precision for dangerous objects.

Note that when obtaining detection data by cancelling the unnecessary output due to the terahertz waves using the above-described combination, it is preferable that there is at least one cancel cycle during the one-frame time period (1Frame) that was shown in FIG. 9 or the one-line scanning time period (1H). Alternatively, it is preferable that a one-frame time period is a time period that is an integral multiple of the cancel cycle, or that the one-line scanning time period is a time period that is an integral multiple of the cancel cycle.

Note that in the above explanation, the explanation has been made using an example in which all of the control signals Sync1, Sync2, and SPCLK have a duty ratio of 50%. However, the duty ratio may be other than 50% or more, or in addition, the same results can be obtained even if the duty ratios of the control signals are different. It is possible to understand this because if the on/off state for the terahertz light source and the accumulation process are not synchronized, the sum total of the first voltage signals and the sum total of the second voltage signals during one cancel cycle will be approximately equal.

Furthermore, this effect is not limited to the case of an on/off pattern with a set cycle, and the same effect can also be obtained with a random on/off pattern. In this manner, output can be obtained if the on/off state for the light emission from the terahertz light source and the accumulation process for the terahertz wave detecting sensor are synchronized, and it is possible to cancel the output if they are not synchronized.

Note that in FIG. 12, a case is shown in which the ratio (time periods) at which the on/off pattern for the terahertz wave detecting sensor agrees with the illumination elements for each column is the same for every column. However, the ratio (time periods) at which they agree may also be changed by column.

That is, the illumination efficiency for the illumination elements that are close to the front of the inspection object 150 is high, and therefore, the detection frequency for the terahertz waves from the illumination elements in the third column and the fourth column becomes high, and the detection frequency for the terahertz waves from the illumination elements in the first column and the sixth column becomes low. It is thereby possible to efficiently radiate terahertz waves.

That is, it is preferable if the detection frequency for the illumination elements that are located relatively toward the inside along the first direction is made higher than the detection frequency for the illumination elements that are located relatively toward the outside (periphery) along the first direction.

Fifth Embodiment

Figure 14:
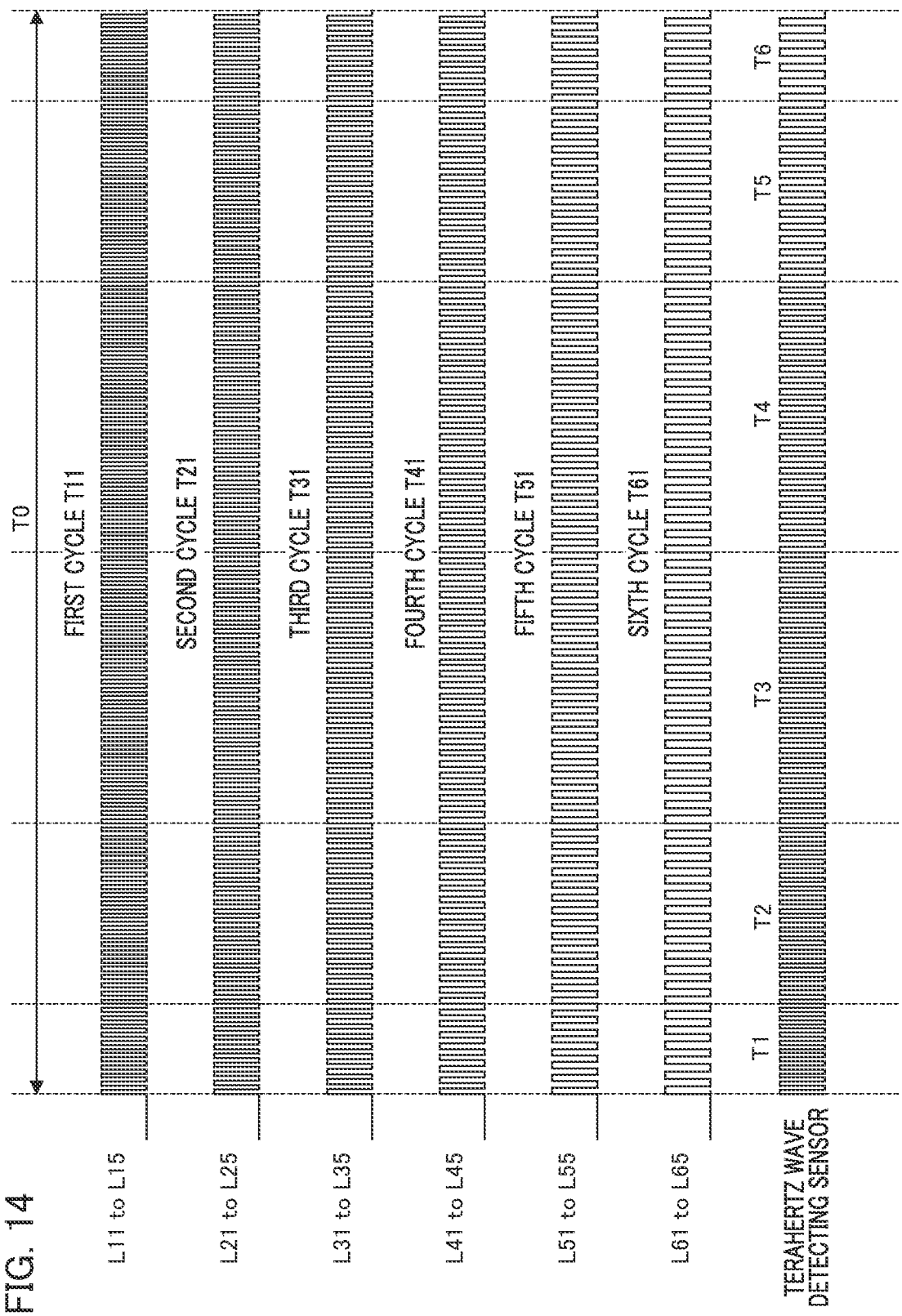
FIG. 14 is a diagram explaining another example of the light emission timings for an inspection system in a Fifth Embodiment.

FIG. 14 is a diagram explaining another example of the light emission timing for an inspection system in the Fifth Embodiment. Note that, in the same manner as in FIG. 12, the detection operation is performed by synchronizing the on/off pattern for the terahertz wave detecting sensor with the same cycle as the first cycle T11 during the time period T1. In the same manner, the detection operation is performed by synchronizing this with the same cycle as the second cycle T21 to the sixth cycle T61 respectively during the time periods T2 to T6.

The method for raising the detection frequency is, as in FIG. 14, making the time periods T3 and T4 for detecting the terahertz waves from the illumination elements in the third column and the fourth column longer than the time periods T1, T2, T5, and T6 for detecting the terahertz waves from the other illumination elements. In this context, T1=T6<T2=T5<T3=T4.

That is, it is made such that the detection period in the camera unit is longer than the illumination elements that are located relatively toward the inside along the first direction than for the illumination elements that are located relatively toward the outside (periphery) along the first direction.

Sixth Embodiment

Alternatively, this may be made as is shown in FIG. 15. That is, FIG. 15 is a diagram explaining an example of the light emission timing for an inspection system in the Sixth Embodiment, and as is shown in FIG. 15, the non-detection time period may be made short, and the detection frequency per the unit time period TO may be raised.

That is, it is preferable to make the detection frequency for the illumination elements that are located relatively toward the inside along the first direction (X axis) larger than the detection frequency for the illumination elements that are located relatively toward the outside (periphery) along the first direction (X axis).

That is, it is preferable that the non-detection time period in the camera unit is made shorter for the illumination elements that are located relatively toward the inside along the first direction than for the illumination elements that are located relatively toward the outside (periphery) along the first direction.

In FIG. 15, each of the time period T1 and the time period T6 occur once during the unit time period TO, and the time period T2 and the time period T5 are present two times each.

Furthermore, the time period T3 and the time period T4 are configured so as to be present three times each. Note that, as in FIG. 12, for each of the time periods T1 to T6, the on/off cycle for the terahertz wave detecting sensor are sequentially switched during each of the first cycle T11 through the sixth cycle T61.

In contrast, in the case in which the user would like to emphasize the shadow from the concealed object, it is preferable that the illumination frequency for the illumination elements in the first column and the sixth column be made higher, as can be understood from FIG. 5 (A), and (C). That is, it is preferable to be made such that the light emission frequency (detection period) for the illumination elements that are located relatively toward the outside (periphery) along the first direction (X axis) is larger (longer) than the light emission frequency (detection period) for the illumination elements that are located relatively toward the inside along the first direction (X axis).

In this case, it is sufficient if, for example, during the unit time period T0, the time period T1 and the time period T6 are present 3 times each, the time period T2 and the time period T5 are present two times each, and the time period T3 and the time period T4 are present one time each.

In addition, it is also possible to change the detection frequency for terahertz waves according to the on/off cycle (detection period) for the illumination elements and the terahertz wave detecting sensor. As can be understood from FIG. 15, in the case in which the Sync signal, which controls the on/off state of the light emission from the illumination elements, and the SPCLK signal, which controls the on/off state of the detection for the terahertz wave detecting sensor are synchronized, the output signal POUT will increase as the number of times accumulation is performed increases.

That is, it is possible to make the detection frequency for terahertz waves higher as the on/off cycle (detection period) for the illumination elements and the terahertz wave detecting sensor become shorter.

Therefore, in the case in which the user would like to efficiently radiate terahertz waves, it is better if the light emission and detection cycles for the illumination elements located inside along the first direction (X axis) that is perpendicular with the optical axis 121 of the camera unit 120, are shorter than the light emission and detection cycles for the illumination elements that are located relatively toward the outside (periphery).

In contrast, in the case in which the user would like to emphasize the shadow from the concealed object, it is preferable that the cycles for the light emission and detection are shorter and the detection frequency is higher for the illumination elements that are located relatively toward the outside (periphery) along the first direction (X axis) than the light emission and detection cycles for the illumination elements that are located relatively toward the inside. That is, in this case, for example, the light emission cycle should be made T31=T41<T21=T51<T11=T21, or the like.

Furthermore, the light emission timings at one portion of the columns may also be equal. As can be understood from FIG. 3, the difference in the shape of the shadows from the concealed object during the illumination of adjacent columns is small. Therefore, the light emission timing may be changed for, for example, every two rows.

Seventh Embodiment

In the inspection system that is shown in the Seventh Embodiment, only the radiation direction of the illumination elements is different from the inspection systems shown in the First Embodiment to the Sixth Embodiment.

Figure 16:
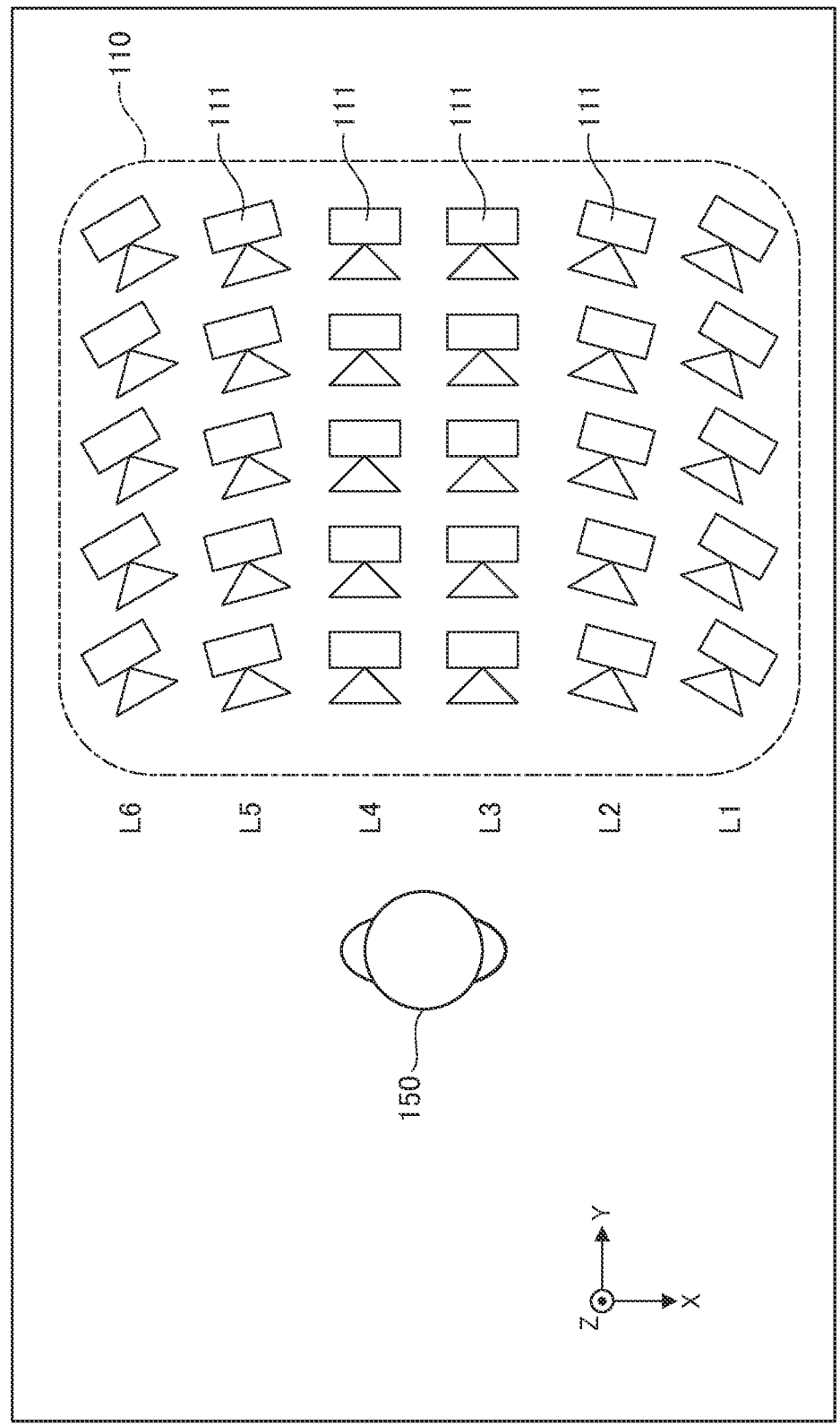
FIG. 16 is an overhead diagram in which an inspection system in a Seventh Embodiment is seen from above.

FIG. 16 is an overhead diagram in which an inspection system in a Seventh Embodiment is seen from above. The angles that are formed by the radiation direction for L11 to L15/L61 to L65 (optical axis) and the direction of the Y axis are larger than the angles that are formed by the radiation directions for L21 to L25, and L51 to L55 (optical axis) and the direction of the Y axis. In addition, the angles that are formed by the radiation directions for L21 to L25, and L51 to L55 (optical axis) and the direction of the Y axis are larger than the angles that are formed by the radiation directions for L31 to L35, and L41 to L45 (optical axis) and the direction of the Y axis.

That is, the angle that is formed by optical axis of the lighting elements that are located relatively toward the outside (periphery) along the first direction that is perpendicular to the optical axis of the camera unit and the second direction that is orthogonal to the first direction is larger than the angle that is formed by the optical axis of the illumination elements that are located relatively toward the inside along the first direction and the second direction. By making such a configuration, it is possible to increase the detection precision for dangerous objects.

This is due to the terahertz waves causing a mirror reflection off of the subject surface of the inspection object 150, and from among the terahertz waves that are radiated from the illumination elements 111, only the terahertz waves with a positional relationship to the illumination elements, subject surface, and camera unit that fulfills the law of reflection, will enter the camera unit 120.

Therefore, when a human body is seen from above, it becomes an elliptical shape such that the center becomes convex along the first direction that is perpendicular to the optical axis of the camera unit, and thereby, the radiation direction for the illumination being aligned with this elliptical shape enables increasing the radiation efficiency for the illumination.

The inspection system 100 is provided with the display unit 170 as is shown in FIG. 1, and the images that are formed by the terahertz waves that have been obtained by driving the illumination elements in each column are displayed as a continuous video image. Alternatively, they may also be displayed separately for each illumination element that emits light during the obtained timings.

In addition, synthesis processing that synthesizes a plurality of images may also be performed in the processor 160. For example, the portion for which the luminance value is the lowest when the images for each illumination element that emits light during a predetermined timing are compared may be considered the shadow, and images from the timings when the luminance value was the lowest may also be synthesized.

Alternatively, the portion for which the difference in luminance values is large when the images for each illumination element that emit light during a predetermined timing are compared may be considered the shadow, and a pixel signal in which the difference in the luminance value is larger than a predetermined threshold may also be synthesized.

Eighth Embodiment

In the inspection systems in the First Embodiment to the Seventh Embodiment, the inspection systems had a plurality of illumination elements and one camera unit. However, the inspection system in the Eight Embodiment differs on the point that it has a plurality of camera units.

Figure 17:
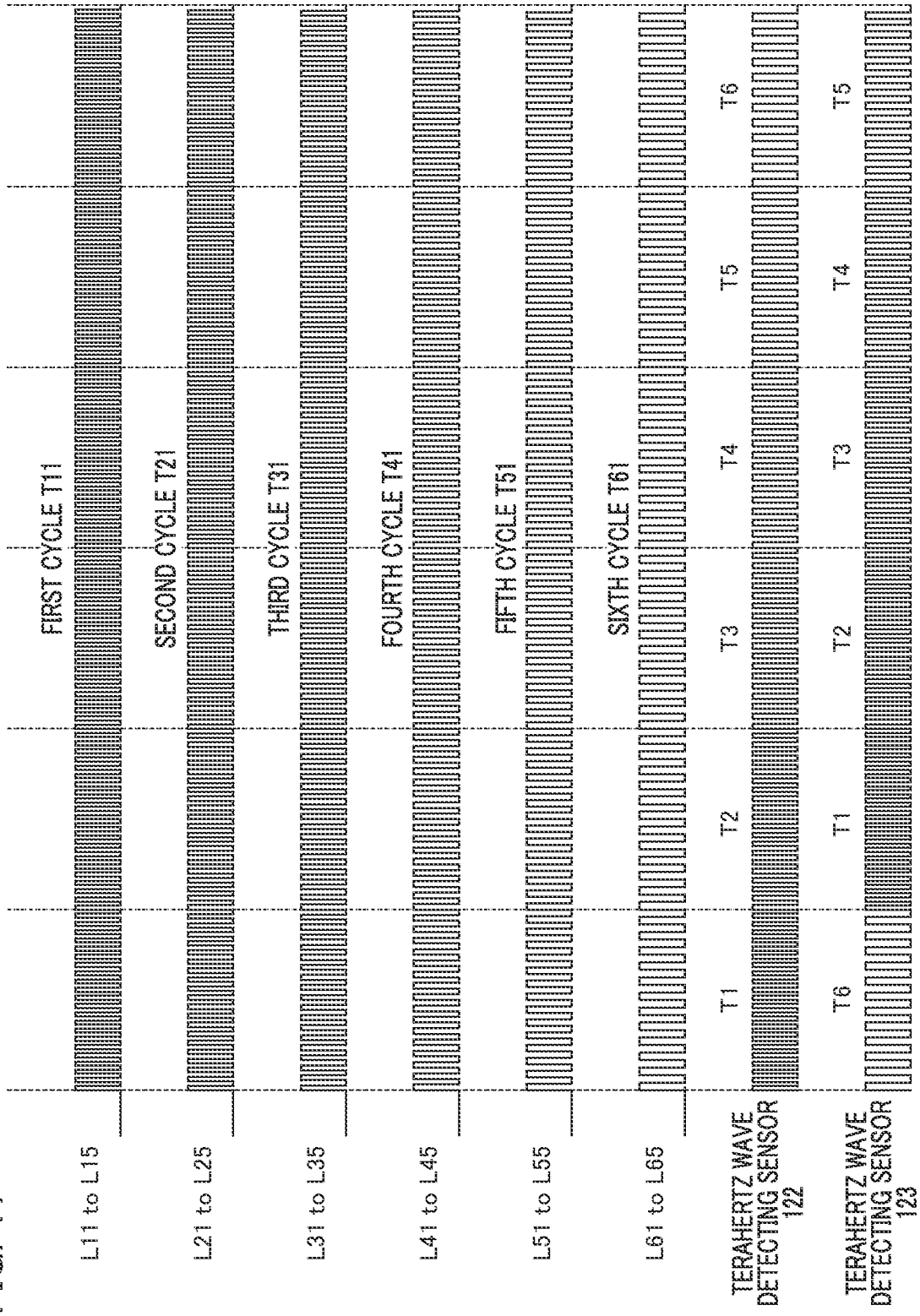
FIG. 17 is a diagram explaining the on/off timing for the illumination elements and the terahertz wave detecting sensor in the case in which an inspection system in an Eight Embodiment has a plurality of camera units.

FIG. 17 is a diagram explaining the on/off timing for the illumination elements and the terahertz wave detecting sensor in the case in which an inspection system in an Eight Embodiment has a plurality of camera units. Note that as in the First Embodiment to the Seventh Embodiment, during each of the time periods T1 to T6, the on/off cycle for the terahertz wave detecting sensor is sequentially switched during each of the first cycle T11 to the sixth cycle T61. In FIG. 17, a case in which the inspection system has two camera units (terahertz detecting sensors 122 and 123) is shown. However, there may also be three or more camera units.

As can be understood from FIG. 17, the two terahertz detecting sensors operate using mutually different detection patterns (the detection cycle, and the on/off cycle). That is, the on/off cycles for the two terahertz detecting sensors are mutually different.

As was explained using FIG. 15, in the case in which the detection cycle for the light emitting cycle for the illumination elements and the terahertz wave detecting sensor are different, the output due to the terahertz waves is cancelled. Therefore, it is possible in both the terahertz wave detecting sensor 122 and the terahertz wave detecting sensor 123 to obtain terahertz images for conditions in which only the illumination elements for predetermined columns were made to emit light, and it is possible to increase the detection precision for dangerous objects.

In addition, detection is performed such that the on/off state of the light emission cycles for the two terahertz wave detecting sensors are mutually different, and therefore, the frequency at which terahertz images that have been formed by the terahertz waves from the illumination elements of each column are obtained is higher than that of the inspection system that is shown in the Second Embodiment. It is thereby possible to suppress decreases in the detection precision for dangerous objects, even in the case in which the inspection object 150 has moved, which is preferable.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

For example, in the Embodiments, the example of detecting a concealed object has been explained. However, the inspection system of the present invention can also be applied to, for example, inspection systems that inspect objects that are carried on a conveyor belt, and also includes such articles.

In addition, as a part or the whole of the control according to the embodiments, a computer program realizing the function of the embodiments described above may be supplied to the inspection system through a network or various storage media. Then, a computer (or a CPU, an MPU, or the like) of the inspection system may be configured to read and execute the program. In such a case, the program and the storage medium storing the program configure the present invention.

This application claims the benefit of Japanese Patent Application No. 2021-166027 filed on Oct. 8, 2021, which is hereby incorporated by reference herein in its entirety.

What is claimed is:

1. An inspection system comprising:
    an illumination device that has a plurality of illumination elements that radiate terahertz waves;
    a camera configured to capture images of the terahertz waves that have been reflected off of an object that has been irradiated by the plurality of illumination elements;
    at least one memory storing instructions; and
    at least one processor configured to execute the stored instructions that cause the at least one processor to function as:
    a controller configured to perform control so as to make light emission timings for the plurality of illumination elements different,
    wherein the illumination elements are disposed in different locations along a first direction that is perpendicular to an optical axis of the camera,
    wherein the illumination elements are two-dimensionally arranged along the first direction and a second direction that is orthogonal to the first direction, and
    wherein the light emission timings of illumination elements that are disposed in different locations along the first direction are different, and the light emission timings of the illumination elements disposed in corresponding locations along the first direction are the same.

2. The inspection system according to claim 1, wherein an illumination frequency of the illumination elements that are located relatively toward the inside along the first direction is different from an illumination frequency the illumination elements that are located relatively toward the outside along the first direction.

3. The inspection system according to claim 2, wherein the illumination frequency for the illumination elements that are located relatively toward the inside along the first direction is higher than the illumination frequency for the illumination elements that are located relatively toward the outside along the first direction.

4. The inspection system according to claim 3, wherein the light emission time period for the illumination elements located relatively toward the inside along the first direction is longer than the light emission time period for the illumination elements located relatively toward the outside along the first direction.

5. The inspection system according to claim 3, wherein the non-light emission time period for the illumination elements located relatively toward the inside along the first direction is shorter than the non-light emission time period for the illumination elements located relatively toward the outside along the first direction.

6. The inspection system according to claim 2, wherein the light emission frequency is higher for the illumination elements that are located relatively toward the outside along the first direction than the light emission frequency for the illumination elements that are located relatively toward the inside along the first direction.

7. The inspection system according to claim 6, wherein the light emission time period for the illumination elements located relatively toward the outside along the first direction is longer than the light emission time period for the illumination elements located relatively toward the inside along the first direction.

8. The inspection system according to claim 6, wherein the non-light emission time period is shorter for the illumination elements located relatively toward the inside along the first direction than the non-light emission time period for the illumination elements located relatively toward the outside along the first direction.

9. An inspection system:
an illumination device that has a plurality of illumination elements that radiate terahertz waves;
a camera configured to capture images of the terahertz waves that have been reflected off of an object that has been irradiated by the plurality of illumination elements;
at least one memory storing instructions; and
at least one processor configured to execute the stored instructions that cause the at least one processor to function as:
a controller configured to perform control so as to make the light emission patterns for the plurality of illumination elements different,
wherein the illumination elements are two dimensionally arranged along a first direction that is perpendicular to an optical axis of the camera and a second direction that is orthogonal to the first direction, and the illumination patterns of the illumination elements that are disposed are different locations along the first direction are different,
wherein the light emission patterns of the illumination elements that have been disposed at corresponding locations along the first direction are the same, and
wherein an inspection frequency in the camera is different between the illumination elements located relatively toward the inside along the first direction and the illumination elements located relatively toward the outside along the first direction.

10. The inspection system according to claim 9, wherein a detection frequency for the illumination elements that are located relatively toward the inside along the first direction is higher than a detection frequency for the illumination elements that are located relatively toward the outside along the first direction.

11. The inspection system according to claim 10, wherein a detection time period in the camera for the illumination elements located relatively toward the inside along the first direction is longer than a detection time period in the camera for the illumination elements that are located relatively toward the outside along the first direction.

12. The inspection system according to claim 10, wherein a non-detection time period in the camera for the illumination elements located relatively toward the inside along the first direction is shorter than a non-detection time period in the camera for the illumination elements located relatively toward the outside along the first direction.

13. The inspection system according to claim 10, wherein an inspection cycle in the camera for the illumination elements located relatively toward the inside along the first direction is shorter than an inspection cycle in the camera for the illumination elements located relatively toward the outside along the first direction.

14. The inspection system according to claim 9, wherein, a detection frequency for the illumination elements that are located relatively toward the outside along the first direction is higher than a detection frequency for the illumination elements that are located relatively toward the inside along the first direction.

15. The inspection system according to claim 14, wherein a detection time period in the camera for the illumination elements located relatively toward the outside along the first direction is longer than a detection time period in the camera for the illumination elements that are located relatively toward the inside along the first direction.

16. The inspection system according to claim 14, wherein a non-detection time period in the camera for the illumination elements located relatively toward the inside along the first direction is shorter than a non-detection time period in the camera for the illumination elements located relatively toward the outside along the first direction.

17. The inspection system according to claim 14, wherein the inspection cycle in the camera is shorter for the illumination elements located relatively toward the outside along the first direction than for the illumination elements located relatively toward the inside along the first direction.

18. The inspection system according to claim 9, wherein an angle that is formed by an optical axis of the illumination elements that are located relatively toward the outside along the first direction and the second direction is larger than an angle that is formed by an optical axis of the illumination elements that are located relatively toward the inside along the first direction and the second direction.

19. The inspection system according to claim 1, wherein an on/off pattern for detecting the terahertz waves in the camera is cyclically switched.

20. The inspection system according to claim 1, where the inspection system has a plurality of cameras.

21. The inspection system according to claim 20, wherein the cameras operate using mutually different detection patterns.

22. The inspection system according to claim 1, wherein images for each illumination element that emitted light during a predetermined timing are compared, and an image is synthesized for the timing during which the luminance value was the lowest.

23. The inspection system according to claim 1, wherein images for each illumination element that emitted light during a predetermined timing are compared, and a pixel signal in which the difference in luminance values is larger than a predetermined threshold is synthesized.

24. A non-transitory computer-readable storage medium configured to store a computer program to control an inspection system to execute the following steps:
an illumination step having a plurality of illumination elements radiate terahertz waves;
an image capturing step in which images are captured by a camera of the terahertz waves that have been reflected off of an object that has been irradiated by the plurality of illumination elements; and
a control step in which control is performed so as to make the light emission timings for the plurality of illumination elements different,
wherein the illumination elements are disposed in different locations along a first direction that is perpendicular to an optical axis of the camera,
wherein the illumination elements are two-dimensionally arranged along the first direction and a second direction that is orthogonal to the first direction,
wherein the light emission timings between the plurality of illumination elements that have been disposed in different locations along the first direction are different, and the light emission timings between the illumination elements that have been disposed in corresponding locations along the first direction are the same.

25. A non-transitory computer-readable storage medium configured to store a computer program to control an inspection system to execute the following steps:
an illumination step having a plurality of illumination elements that radiate terahertz waves;
an image capturing step in which images are captured of the terahertz waves that have been reflected off of an object that has been irradiated by the plurality of illumination elements; and a control step in which control is performed so as to make the light emission patterns for the plurality of illumination elements different, wherein the plurality of illumination elements is disposed in different locations along a first direction that is perpendicular to an optical axis of the camera, wherein the plurality of illumination elements is two-dimensionally arranged along the first direction and a second direction that is orthogonal to the first direction, and wherein the light emission timings between the plurality of illumination elements that have been disposed in different locations along the first direction are different, and the light emission timings between the illumination elements that have been disposed in corresponding locations along the first direction are the same.

26. The inspection system according to claim 1, wherein the plurality of illumination elements includes first illumination elements and second illumination elements, wherein the first illumination elements are arranged along the first direction, and the second illumination elements are arranged along the second direction, and wherein a first light emission time period for the first illumination elements and a second light emission time period for the second illumination elements are not overlapped.

* * * * *